(12) United States Patent
Noguchi

(10) Patent No.: US 6,570,997 B2
(45) Date of Patent: *May 27, 2003

(54) IMAGE PROCESSING APPARATUS AND METHOD THEREFOR, AND STORAGE MEDIUM

(75) Inventor: Yasutaka Noguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,758

(22) Filed: Mar. 19, 1999

(65) Prior Publication Data
US 2003/0007661 A1 Jan. 9, 2003

(30) Foreign Application Priority Data

Mar. 20, 1998 (JP) .......... 10-072222
Mar. 20, 1998 (JP) .......... 10-072223
Mar. 20, 1998 (JP) .......... 10-072225

(51) Int. Cl.$^7$ ................ G06K 9/00
(52) U.S. Cl. .......... 382/100; 713/176; 713/179
(58) Field of Search .............. 382/100, 232; 380/210, 287, 252; 713/176, 179

(56) References Cited

U.S. PATENT DOCUMENTS

| 4,788,598 | A | * | 11/1988 | Ochi et al. | 358/429 |
| 5,398,308 | A | * | 3/1995 | Kato et al. | 345/433 |
| 5,638,464 | A | * | 6/1997 | Kawamura | 382/232 |
| 5,917,947 | A | * | 6/1999 | Ishida et al. | 382/232 |
| 5,991,469 | A | * | 11/1999 | Johnson et al. | 382/317 |
| 6,246,802 | B1 | * | 6/2001 | Fujihara | 382/276 |

FOREIGN PATENT DOCUMENTS

JP      06-123747      5/1994

* cited by examiner

Primary Examiner—Timothy M. Johnson
Assistant Examiner—Abolfazl Tabatabai
(74) Attorney, Agent, or Firm—Fitzpatrick, Cella, Harper & Scinto

(57) ABSTRACT

An image processing method comprises the steps of developing coded data into image data by analyzing them, at the same time, creating the positional information within one display of the image data, discriminating the area to embed a pattern that indicates a specific addition information therein in accordance with the kind of image data and the positional information created in the development step at the time of development, and embedding the information hardly discriminately by eye-sight in the area discriminated in the discrimination step.

19 Claims, 19 Drawing Sheets

UNIT AREA 200, 202, 201

IMAGE

IMAGE

UNIT DOT PATTERN 250
252
251

FIG. 22A
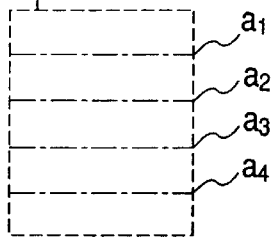
LAYOUT A
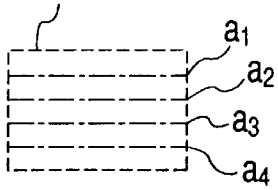
LAYOUT B
LAYOUT C
FIG. 22B     FIG. 22C
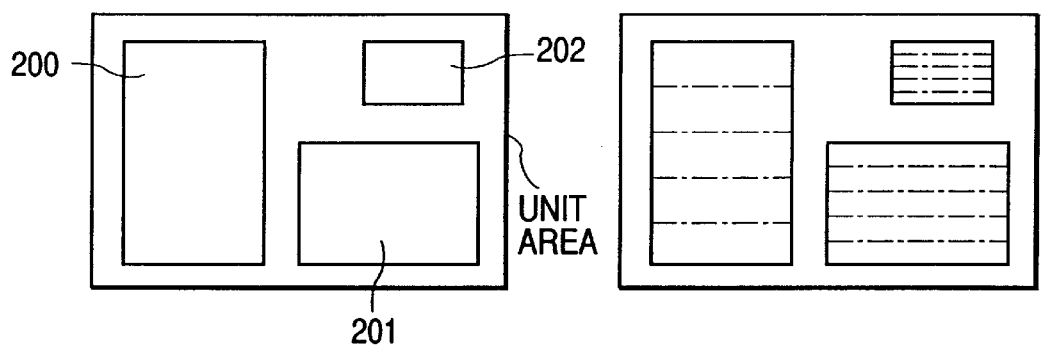
FIG. 22D
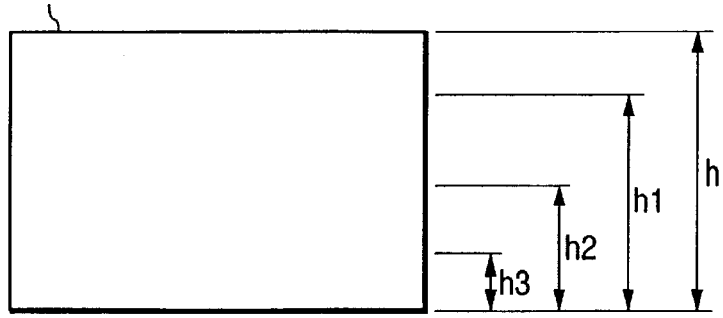
IN CASE THAT INFORMATION ADDITION
AREA'S HEIGHT IS DEFINED AS hx,
WHEN $h > hx \geq h_1$, "ADD INFORMATION BY USING LAYOUT A"
WHEN $h_1 > hx \geq h_2$, "ADD INFORMATION BY USING LAYOUT B"
WHEN $h_2 > hx \geq h_3$, "ADD INFORMATION BY USING LAYOUT C"
WHEN $h_3 > hx \geq 0$, INFORMATION IS NOT ADDED

IMAGE PROCESSING APPARATUS AND METHOD THEREFOR, AND STORAGE MEDIUM

BACKGROUND OF THE INVENTION

1. Field of the Invention

The present invention relates to an image processing apparatus capable of providing input images with additional information, and a method therefor. Also, the invention relates to a storage medium that stores such method.

2. Related Background Art

In recent years, an image formation apparatus, such as a color copying machine, a color printer, has begun to be able to form high quality color images. With such advancement, the images can be formed even almost the same as the bank notes, securities, and the like.

However, since the formation of such images as those valuables is prohibited, there is known the techniques to suppress the formation thereof.

For example, there is a method to provide (embed) a pattern that may specify the name of an image formation apparatus in use or the user thereof, which is hardly discriminative by eye-sight for all the images formed by the image formation apparatus. Here, this additional information is provided only for the yellow component of the Y (yellow), M (magenta), C (cyan) and K (black) which form a color image, hence making it difficult for the human eyes to discriminate the presence of such additional information.

In this respect, the provision of this additional information is usually executed after the image data, which is written in the page description language, is developed into an image, and also, after all the related image processes and others are completed. This is because the image is reliably formed without changing the configuration of the pattern that represents the additional information if the addition of the additional information is performed immediately before the formation of the image.

In this way, should there be an image which is formed illegally, it is possible to know the various circumstances under which such image has been formed by decoding, by means of the decoding the above-described additional information from the image thus formed using a special decoding device.

Also, the additional information described above is usually provided for a one-page portion of an image as a whole (embedded invisibly by eye-sight on the entire recordable area of the image). As a result, the overall image quality is subjected to degradation, because with this method, the pattern that represents the additional information is even superposed with the marginal portion and the like of the image inevitably. Here, in order to solve this particular problem, it has been proposed to embed the additional information invisibly by eye-sight only on the area where the image is formed.

As described above, the conventional page printer, or the like develops the coded data which is written in the page description language for the image formation, and performs various image processes after the development of the input of the coded data, and then, appends the pattern that represents additional information lastly in such a manner as to make it hardly discriminative by eye-sight.

Here, for the page printer, it is possible to form separately the printer controller that performs the development of the coded data and image processes, and the printer engine that receives the image data thus processed and performs the image formation lastly. It is, therefore, considered preferable conventionally that the above-described additional information is added by use of the printer engine.

Conventionally, it is more likely to be practiced that a host computer is usually used to input the image data that may be fabricated as the counterfeit image. Therefore, it is essentially meaningless to add the above-described additional information to the character strings and graphics other than the objective image. This type of additional operation may only invite the degradation of the image as a whole.

Each size of the object images, which are developed from each of the coded data written in the page description language, tends to vary widely from a comparatively large one, such as a bank note, to a smaller one, such as a postage stamp.

As a result, if the pattern which is added to images is in one and the same size or in one and the same cycle, irrespective of the sizes of the images to be formed, there is a fear that the pattern that represents the additional information is not reliably added to certain illegally formed object image which may include any one of them, such as those of the bank notes or post cards, as the case may be.

SUMMARY OF THE INVENTION

The present invention is aimed at solving all the problems discussed above or solving at least one of them.

In order to achieve such objectives, the present invention makes it possible to minimize the load of processes required for adding the additional information to the inputted image hardly discriminately by eye-sight without degrading the quality of the ultimately image when the image is formed by developing once the coded data having a plurality of commands therefor.

With such objectives in view, one preferred embodiment of the present invention discloses a method which comprises the following steps of: developing coded data into image data by analyzing them, at the same time, creating the positional information within one display of said image data; discriminating the area to embed a specific information therein in accordance with the positional information created in the development step at the time of development; and embedding the information hardly discriminately by eye-sight in the area discriminated in the discrimination step.

It is also an object of the invention to provide an image processing method which is capable of embedding the information in a small-sized image in good condition.

It is another object of the invention to provide an image processing method which is capable of embedding the information even in the images of various sizes in good condition.

It is still another object of the invention to make it possible for an image processing apparatus capable of forming the object images of plural sizes to add the pattern that indicates the additional information reliably to each of the objects hardly discriminately by eye-sight so as to suppress the formation of illegal images.

It is a further object of the invention to develop the coded data written in a specific description language, and add the pattern suitable for each object hardly discriminately by eye-sight when each of the object images is formed corresponding to the coded data thus developed, hence suppressing the formation of illegal images.

It is still a further object to the invention to provide a method for embedding the additional information having new functions.

Also, it is another object of the invention to provide a software capable of operating a computer for achieving each of the above-described objects by use of the computer or the medium for storing such software.

Other objectives and advantages besides those discussed above will be apparent to those skilled in the art from the description of a preferred embodiment of the invention which follows. In the description, reference is made to accompanying drawings, which form a part hereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 18A and 18B are views which illustrate one example of a method for representing the information by use of the additional information lines.

FIGS. 22A, 22B, 22C and 22D are views which show still another embodiment in accordance with the present invention.

DETAILED DESCRIPTION OF THE PREFERRED EMBODIMENTS (The Structure of the Apparatus)

Figure 13:
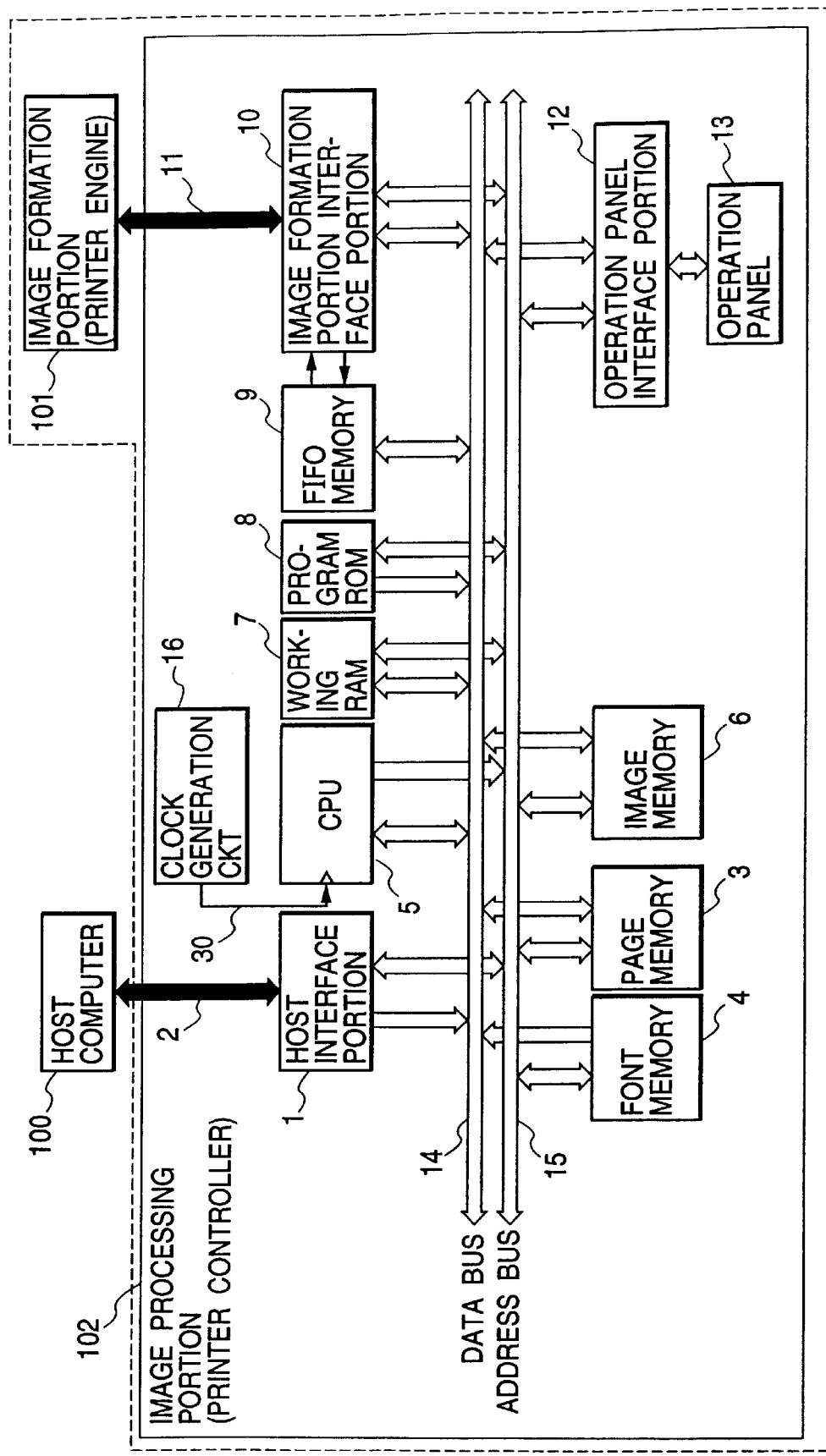
FIG. 13 is a block diagram which shows the hardware structure of the image processing unit.

FIG. 13 is a block diagram which shows the image processing unit (the so-called printer controller) 102 which can execute the formation of full color images, and the image formation unit (the sa-called printer engine) 101.

In FIG. 13, a reference numeral 5 designates the CPU which controls the operation of each unit which is installed in the interior of the image processing unit 102, and the timing of the operation thereof.

A reference numeral 1 designates the host interface unit through which various communications are made between the image processing unit 102 and the host computer 100. This interface is provided with the output buffer that provisionally keeps the data to be transmitted to the host computer 100, and also, provided with the input buffer that keeps provisionally the data received from the host computer 100.

This host interface unit 1 not only inputs and outputs various data between the interface and the host computer 100, but also controls communications with the host computer 100.

Therefore, the various data exchanges between the image processing unit 102 described above or the image formation unit 101 and the host computer 100 are executed through the host interface unit 1 under any circumstances. A reference numeral 2 designates the communication line that connects between the image processing unit 102 and the host computer 100.

The image data written in the page description language should be processed to be an image or formed to be an image, (that is, the coded data written in a specific description language including the character codes, the information of graphical formation, and the control information), and when the image data is inputted into the image processing unit 102, the inputted image data thus written is stored on the page memory 3.

The page memory 3 is provided with a capacity which is good enough to store at least one page portion of the image data written in the page description language, and sequentially stores the image data that includes the character codes, the information of the graphical formation, and the control information for the image on each page.

A reference numeral 4 designates the font memory that stores the character pattern data corresponding to the character codes. Also, the program ROM 8 stores the image development program (the program which analyzes the character codes, and the coded data on the information of the graphical formation, and develops them into the image data that can be processed by the image formation unit 101).

Then, the character codes of the image data written in the page description language, which are received from the host computer 100 and stored on the page memory 3, are converted into the bit patten data by use of the data stored on the font memory 4 and the image development program. The bit pattern data thus converted are developed on the image memory 6 per page unit, which will be described later.

In this respect, the program ROM 8 also stores the control program required for controlling the image processing unit as a whole, and in accordance with this control program, the CPU 5 controls the apparatus as a whole.

A reference numeral designates the random access memory (the working RAM) for use of writing and reading of various provisional data utilized for the process execution using the control program described above.

A reference numeral 6 designates the image memory that stores the bit pattern data prepared by the image development program, which is stored on the program ROM 8, as the image data, and this memory is capable of storing at least one page portion of the image data corresponding to the image data written in the page description language stored on the page memory 3.

Here, the specific description will be made of the procedure of the image data formation. The CPU 5 analyzes the character codes, the information of the graphical formation, and the control information stored on the page memory 3, and produces the various pieces of object information. Then, in parallel with the production of these pieces of object information, the CPU executes the rasterizing process and pseudo-gradation process one after another.

With the rasterizing process, the bit map data is produced by the execution to convert the RGB display color (additive color mixture) contained in the information into the YMCK (subtractive color mixture) which can be processed in the image formation unit, and also, by the execution to convert the character codes to the font data, such as the bit pattern stored in advance and outline fonts. Then, the pseudo-gradation process is executed with respect to the bit map data using the dithering matrix, thus producing the image data that can be processed in the image formation unit 101.

A reference numeral 9 designates the FIFO (First In First Out) memory which receives the image data from the image memory 6 and outputs it to the interface 10 of the image formation unit.

The interface 10 of the image formation unit is provided with the output buffer which provisionally keeps the video signals sent out to the image formation unit 101 and the communication signals (commands or the like) for communicating with the image formation unit 101, and with the input buffer which provisionally keeps the signals sent out from the image formation unit 101. Here, the interface 10 of the image formation unit not only exchanges signals simply with the image formation unit 101, but also, controls the communications with the image formation unit 101.

A reference numeral 11 designates the communication line through which the data is exchanged between the image processing unit 102 and the image formation unit 101 shown in the block diagram in FIG. 13.

A reference numeral 13 designates the operation panel formed by the keyboard and some other command input means, and the CRT display and some other indication devices as well. By use of the command input means, the operator is able to set the on line/off line condition of the host interface unit 1 and the like, and input instructions for setting the operational environment of each unit, and others. Also, by use of the display devices, it becomes possible to effectuate monitoring indications of the operational conditions of the image formation unit 101 (such as in the printable condition or not), and also, those of the image processing unit 102 (such as in the development of the image data written in the page description language or some others).

The command signals provided through the operation panel 13 are inputted into the data bus 14 and address bus 15 by way of the interface 12 of the operation panel. The signals of the display information are output to the operation panel 13 through the interface 12 of the operation panel.

Also, the clock signals 30 output from the clock generation circuit 16 are used by the CPU 5 as clock signals.

(The Adding Method of the Additional Information)

Now, hereunder, the description will be made of the techniques needed for adding the additional pattern formed for the additional information which should be appended to the image data (color image data) invisibly by eye-sight.

Here, also, the description will be made of the processes required for adding the additional information to the n valued multiple color image data.

Also, for each of the embodiments to be described later, the input color image data is formed by the color components of Y (yellow), M (magenta), C (cyan) and K (black). Then, the adding process of the additional information is executed only for part of the color components described above, but not for all of them. For the description hereof, it is arranged to add the additional information only to the Y (yellow) component because, among them, the Y is hardly discriminative by eye-sight. However, the present invention is not necessarily limited to this arrangement. It may be possible to add the additional information to two colors, such as the Y and M.

Now, the structure of the additional pattern will be described below.

The additional pattern which is illustrated here is the pattern which is formed with the arrangement of the plural unit dots formed by plural pixels at specific intervals, and the pattern is capable of showing the information of several bits by the phase difference between unit dots each other.

However, the present invention is not necessarily limited to such pattern as described above, but various other patterns or those buried in the image such as electronic water-mark are also adoptable.

Figure 14:
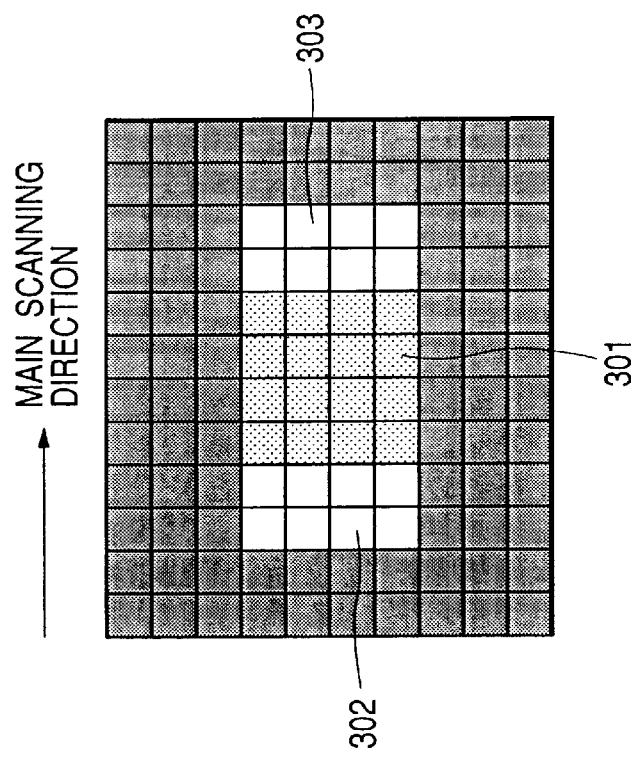
FIG. 14 is a view which shows a method for creating the additional pattern which is used for the process to add information.

FIG. 14 is a view which shows the formation of the unit dots. The unit dots are formed by areas 301, 302, and 303 having 32 pixels in total. In FIG. 14, the 4×4 pixels indicated by the area 301 are the one where the modulation is given so as to increase by α the density of the original image (the yellow component of the image data developed in the image processing unit 102). On the other hand, 16 pixels indicated by the areas 302 and 303 (which are formed to present the same pixel numbers as the area 301 when the two areas are put together) are the one where the modulation is given so as to reduce the density of the original image (the yellow component of the image data developed in the image processing unit 102). Here, the density is not modulated on the areas surrounding unit dots.

In the modulation process described above, the essential density of the image is kept before and after the modulation. Then, the dots are embedded in the Y component, while the density is also kept before and after the dots are embedded. Consequently, it becomes extremely difficult to discriminate the state where the dots are thus embedded visually by eye-sight. However, these dots are made readable sufficiently by use of the decoding device dedicated for such purpose.

As described above, one unit dots represents only one bit information, but using this in plural numbers it becomes possible to represent the additional information formed by plural bits.

Figure 15:
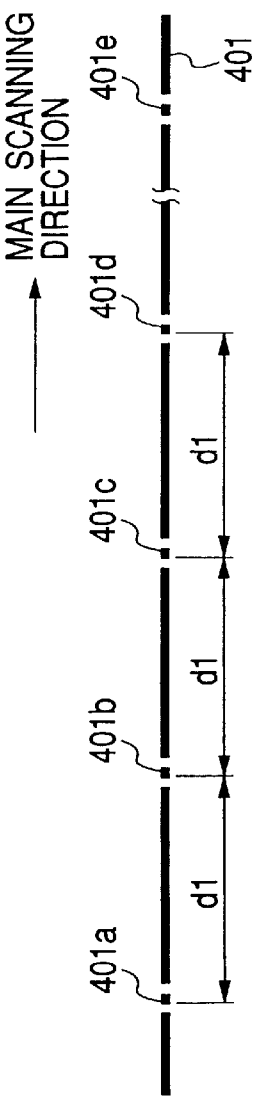
FIG. 15 is a view which shows one example of an additional information line.
Figure 16:
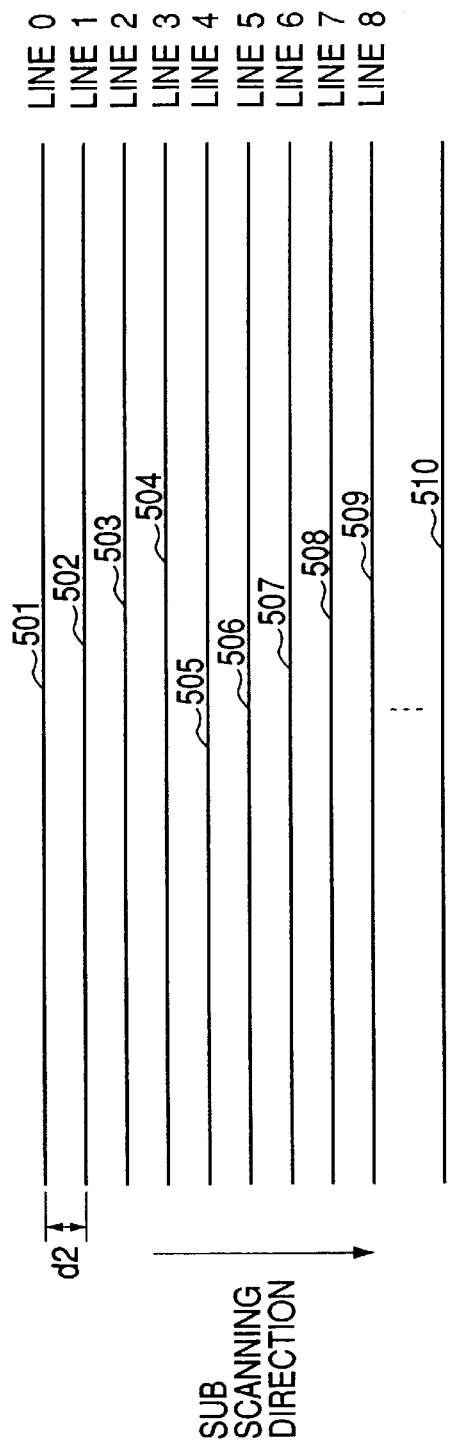
FIG. 16 is a view which shows one example of plural additional information lines.

FIG. 15 and FIG. 16 are views which illustrate the method for showing the additional information by arranging a plurality of the unit dots represented in FIG. 14.

In FIG. 15, a reference numeral 401 designates the add-on line (which has a width of four pixels as in the width of the unit dots) to which the unit dots are added, and the plural lines are present in the image.

Reference numerals 401a to 401e are the unit dots arranged for one add-on line. The unit dots 401a to 401e are arranged in the main scanning direction by a fixed cycle of d1 (128 pixels, for example). Here, in accordance with the present embodiment, it is not the way that the information is shown by the phase difference between the unit dots themselves each other on the same add-on line, but the information is periodically embedded by the positional relationship between each of the unit dots themselves each other on the respective plural lines.

FIG. 16, reference numeral 501 to 510 designate each of the add-on lines, and each line is arranged in the sub-scanning direction by a fixed cycle of d2 (16 pixels, for example).

In accordance with the present embodiment, it is arranged to represent the additional information by the phase difference between the unit dots themselves in the main scanning direction, which are present each other on the approaching add-on lines in the sub-scanning direction.

Although described later in detail, it is possible to represent the four-bit information by the phase difference between the unit dots on the two add-on lines, and by arranging the nine add-on lines 501 to 509 to be one unit dot pattern (the minimum line numbers required for representing the additional information completely), it is also possible to represent the additional information of 32 bits in total (the manufacture's ID, the product number, or the like). In other words, the combination of the nine add-on lines 501 to 509 is periodically embedded as described here.

Figures 12A, 12B:
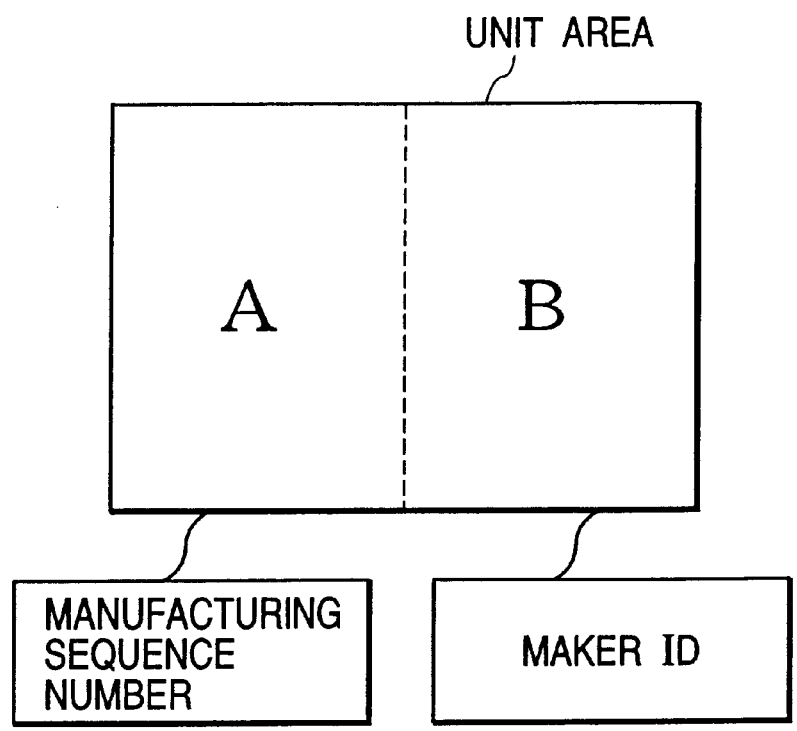
FIGS. 12A and 12B are conceptual views which illustrate the color image data having two pieces of added information.
Figure 17:
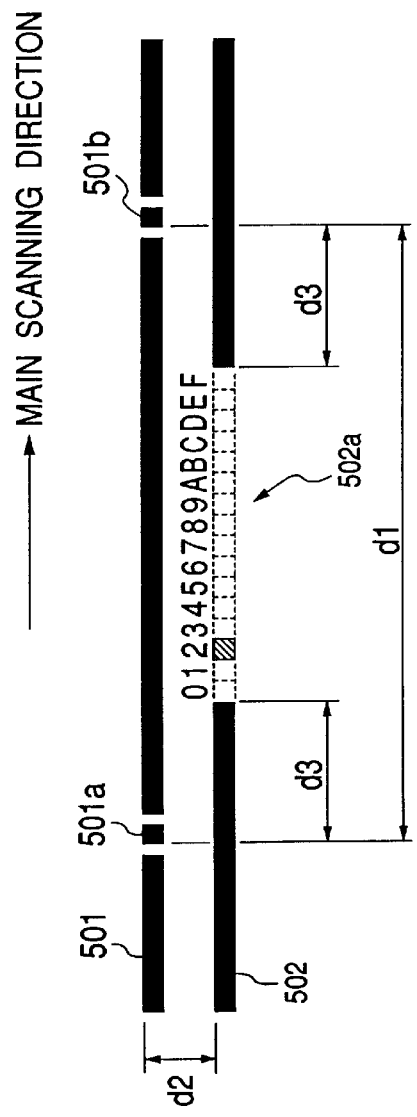
FIG. 17 is a view which shows one example of a method for representing the information by use of the additional information lines.

In this respect, the one unit dot pattern is embedded in each of the areas A and B in FIGS. 12A and 12B independently. In other words, it is assumed that the information of 32+32=64 bits is embedded in one image in FIG. 12. FIG. 17 and FIGS. 18A and 18B are views which illustrate the way in which the unit dots on each of the add-on lines shown in FIG. 16 represent the four-bit information.

In FIG. 17, reference numerals 501 and 502 designate the add-on lines (the line 2 and line 3 in FIG. 16, for example) which are adjacent to each other in FIG. 16. Also, the upper lines 501a and 501b and the lower line 502a are arranged to prevent themselves from being conspicuously visible by eye-sight by arranging each of the unit dots themselves to approach closely in the main scanning direction. To this end, each unit dots of adjacent add-on lines is arranged to be at intervals of at least d3 (32 pixels, for example)

The phase difference between the unit dots 501a and the unit dots 502a in the main direction can be decoded as shown in FIG. 17. Then, the unit dots 502a is added in the position corresponding to the "2" of the phase difference of 0 to F for the unit dots 501a. Therefore, the "2", that is the binary of "0010" is shown by the two add-on lines here.

In this way, the four-bit information can be represented between the two add-on lines. The number of the add-on lines are predetermined in accordance with the amount of additional information.

FIGS. 18A and 18B are views which illustrate the state in which the standard dots are added to specify the header of the add-on line and the order of add-on lines (the top and bottom relationship). This arrangement is provided in order to avoid any misinterpretation of the starting position of the pattern or to avoid any decoding of the additional information which has been given wrongly by interpreting the top and bottom reversely.

Reference numerals 501 and 505 designate the add-on lines shown in FIG. 16. On the add-on line 501 (the head line), the dots 501A to 501D are added at the intervals of d4 (16 pixels, for example) to the right side of all the unit dots 501a to 501d of the additional pattern that represents the information which is desired to be added originally. Therefore, if the unit dots are found to be present on the add-on line in the main scanning direction when approaching such line, it is clear that the line thus found is the header line in the staring position of the additional pattern.

Likewise, on the add-on line 505, the dots 505A to 505D are added at the intervals of d5 (32 pixels, for example) to the right side of all the unit dots 505a to 505d. With the standard dots 505A to 505D, it is possible to specify the fourth add-on line of the 9 lines. In other words, since the zero line and fourth line can be specified in this way, it becomes possible to specify the order (the top and bottom relationship) of all the lines in consequence.

In this respect, the description which has been above is applicable to all the n valued color images.

First Embodiment

Hereinafter, in conjunction with the accompanying drawings, the description will be made of the image processing apparatus which is used for each of the embodiments of the present invention.

The image processing apparatus hereof is a laser beam printer that forms imaged in accordance with the coded data written in the page description language. The present invention, however, is applicable to some other types, such as an ink jet printer, of course.

In this respect, the structure of the apparatus itself is fundamentally the same as that of the apparatus shown in FIG. 13. Therefore, only the characteristics of the present invention will be described in detail as to the operation of each unit.

In accordance with the present embodiment, an additional information (for example, the manufacturer's ID for the image processing apparatus as a whole (a printer), the body number, the model number, the ID of substrates, and some others, or the manufacturer's ID of the image processing unit 102, the body number, the ID of the substrates, and some others) is added to the color image data (image data) obtained by the development of the coded data written in the page description language which has been inputted from the host computer 100 in the image processing unit 102. However, when this adding process is executed, the additional information is not added to the entire area of one page having the images formed on it, but only to the area where the image has been drawn actually as an image portion when the coded data written in the page description language is developed into the image data.

Figure 1A:
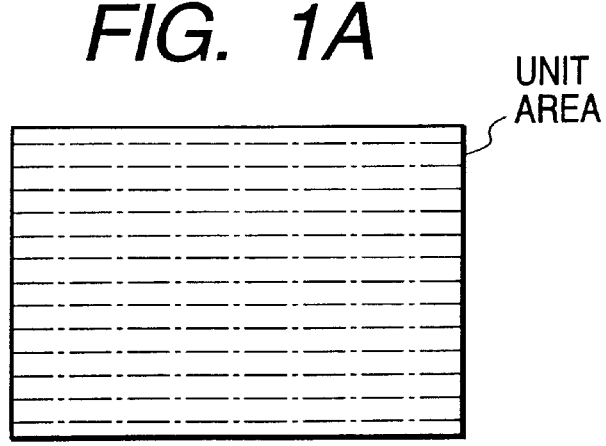
FIGS. 1A, 1B and 1C are conceptual views which illustrate the first embodiment of the present invention.
Figure 1B:
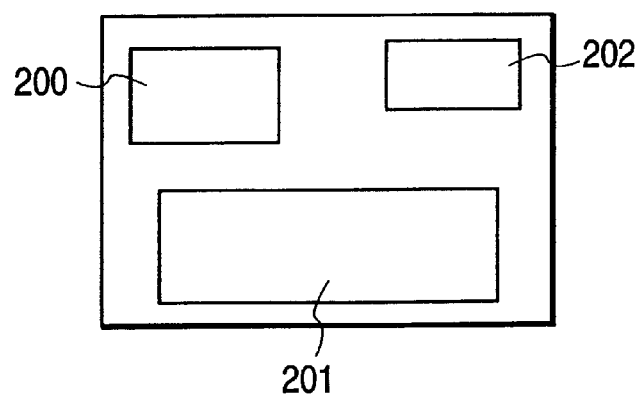
Figure 1C:
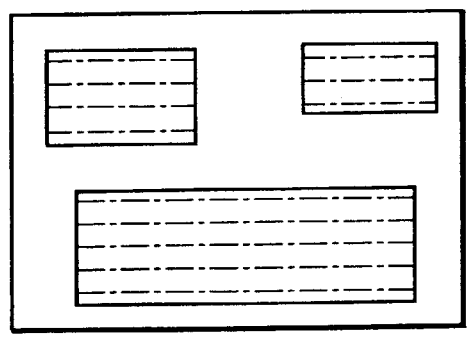

When the additional information is added only to the inside of the draw area of an image in accordance with the present embodiment, the layout of the additional pattern is formed as in FIGS. 1A to 1C for the unit area as a whole, which indicates the entire image of one page portion. After that, the pattern that indicates the additional information shown in FIG. 1A is added only to the inside of the image areas each at 200, 201, and 202 in FIG. 1B, respectively, which is indicated by the image data obtained by developing the coded data written in the page description language, which is inputted from the host computer. In this way, the pattern that indicates the additional information is added as shown in FIG. 1C.

Figure 2:
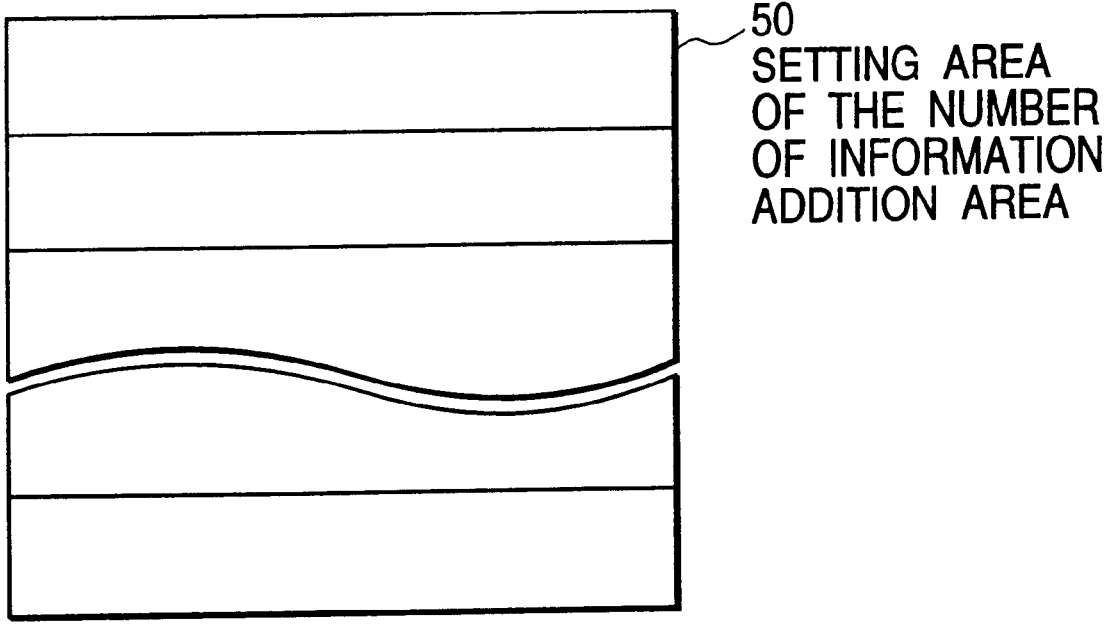
FIG. 2 is a view which shows the memory map secured on the working RAM used for the first embodiment of the present invention.
Figure 3:
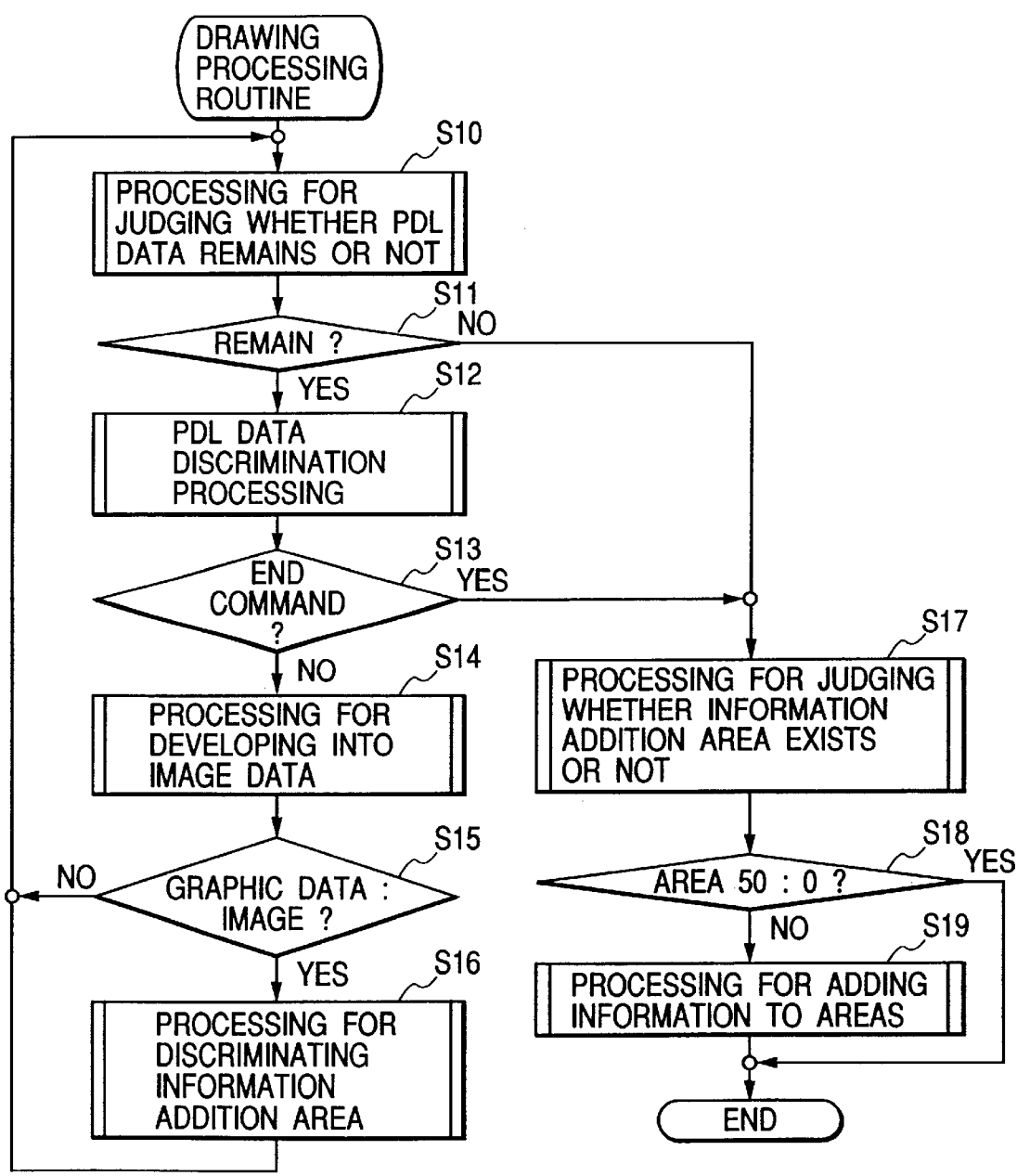
FIG. 3 is a flowchart which shows the process flow in accordance with the first embodiment of the present invention.

FIG. 2 is a memory map secured in the working RAM 7 utilized by the CPU 5 shown in FIG. 13. FIG. 3 is a flowchart which shows the operation embodying the present invention using the hardware structure shown in FIG. 13, and the memory map shown in FIG. 2.

Figure 4:
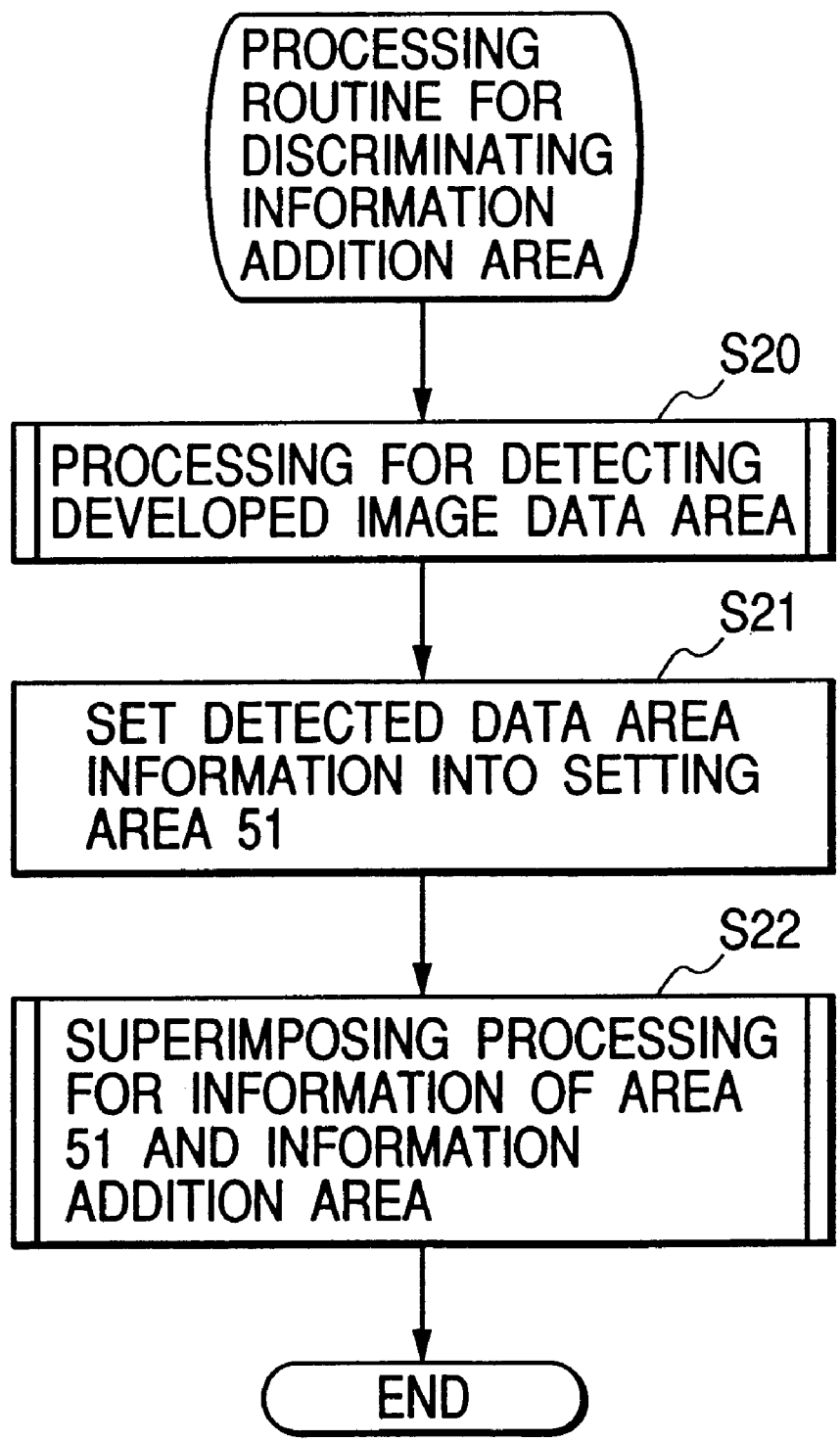
FIG. 4 is a flowchart which illustrates the process flow in detail in accordance with the first embodiment of the present invention.
Figure 9A:
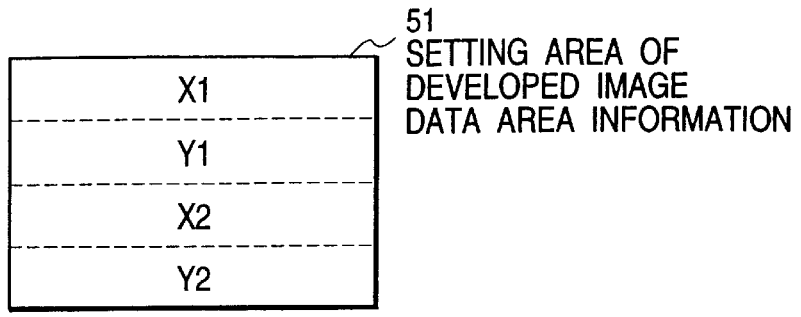
FIGS. 9A and 9B are views which show the memory map secured on the working RAM used for the first embodiment of the present invention.
Figure 9B:
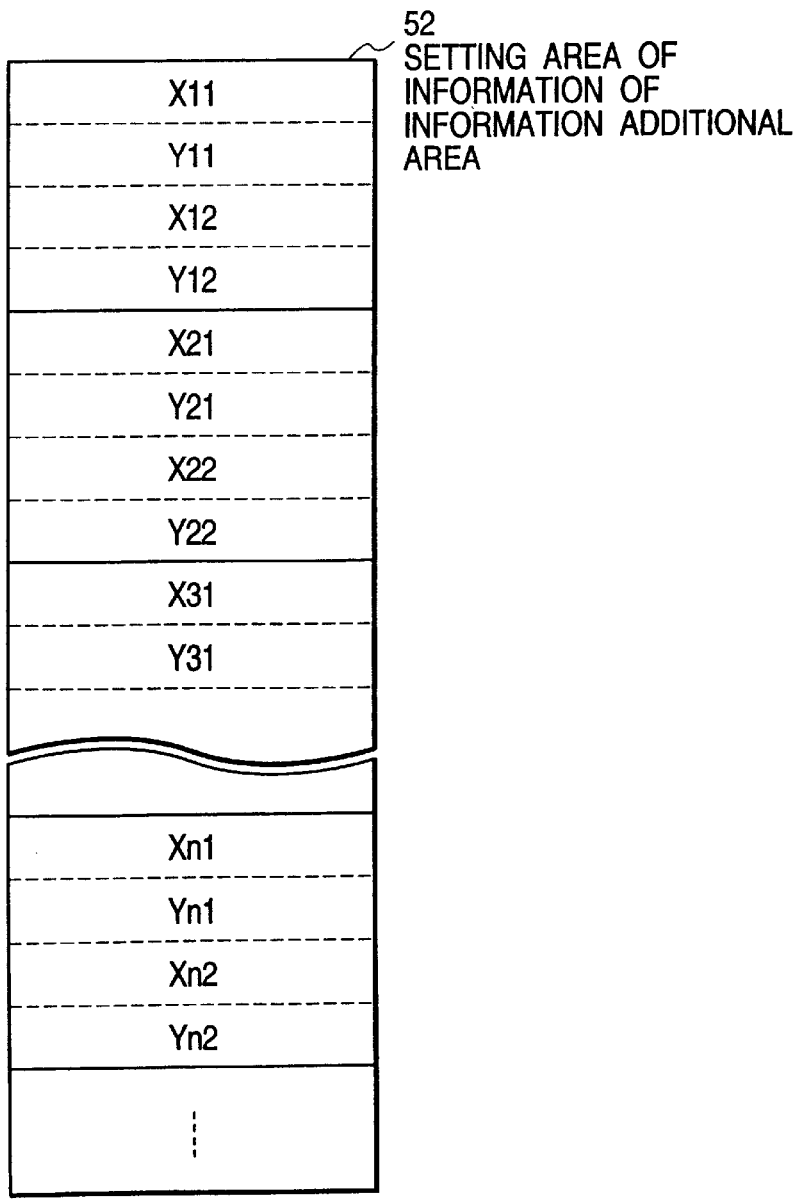

FIGS. 9A and 9B are memory maps secured in the working RAM 7 utilized by the CPU 5. FIG. 4 is a flowchart which shows the operation embodying the present invention using the hardware structure shown in FIG. 13, and the memory maps shown in FIGS. 9A and 9B.

Here, on the program ROM 8 shown in FIG. 13, the control program based upon the flowcharts shown in FIG. 3 and FIG. 4 is stored, and then, the CPU 5 controls each of the operations accordingly.

The setting area 50 of the area numbers of the additional information in the memory map shown in FIG. 2 is the area where the number of draw areas is set for the image data on the image portions developed at 200, 201, and 202 in FIG. 1B when the input of the coded data written in the page description language is developed into the image data. For this area, the initial value 0 is set in the initial process when the draw process routine is executed as shown in FIG. 3.

In the flowchart shown in FIG. 3, it is determined whether or not the coded data written in the page description language (PDL data) inputted by the host computer 100 still remains in the page memory 3 in the step S10 and step S11 of the flowchart. These are the steps to decide on the execution of the flow to follow thereafter.

As a result, if it is found that the coded data still remains, the step S12 is executed. If not, the step S17 is executed.

When the PDL data are analyzed in step S12 and step S13, it is determined whether or not the data is the command to terminate. If negative, the step S14 is executed. If affirmative, the step S17 is executed.

The S14 is the step in which the PDL data stored on the page memory 3 is analyzed, and in accordance with the result thereof, the image data that indicates the character strings, and the graphical or photographic data which indicates the graphics and images are developed into the image data.

The S15 is the step in which the execution of the following flow is determined depending on whether or not the image data thus developed is the graphical one. If the data is found to be images, the step S16 is executed. If not, the step S10 is executed.

The S16 is the step in which the area is discriminated in order to embed the pattern indicating the additional information. This discrimination step will be described later in detail.

The S17 and S18 are the steps in which the execution of the following flow is determined depending on whether or not there is any area (the image drawing area) to which the additional information should be added. Then, if the setting contents of the area 50, where the number of areas to which information should be added, that is, the number of drawing areas, is set and stored, is other than zero, the step S19 is executed. If such content is zero, the drawing process routine terminates.

The S19 is the step in which the pattern that indicates the additional information is embedded with respect to each of the draw areas thus developed corresponding to the numbers set in the area 50.

Figure 5:
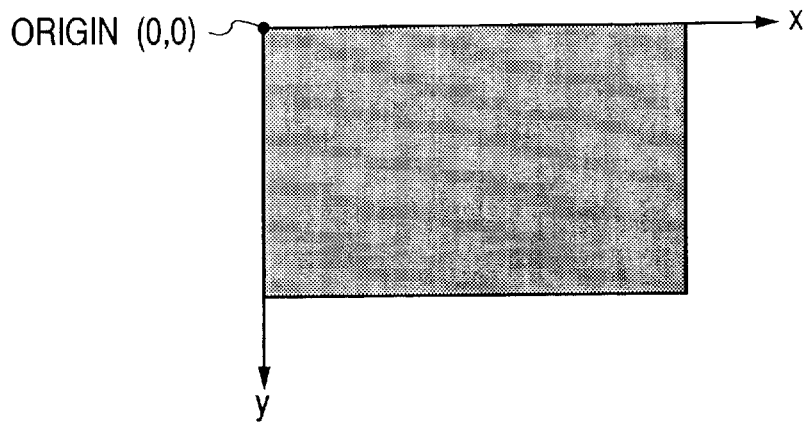
FIG. 5 is a view which illustrates the first embodiment in detail in accordance with the present invention.
Figure 6:
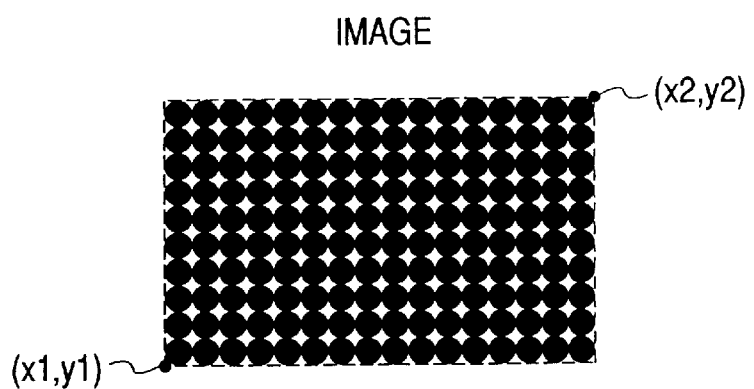
FIG. 6 is a view which illustrates the first embodiment in detail in accordance with the present invention.
Figure 7:
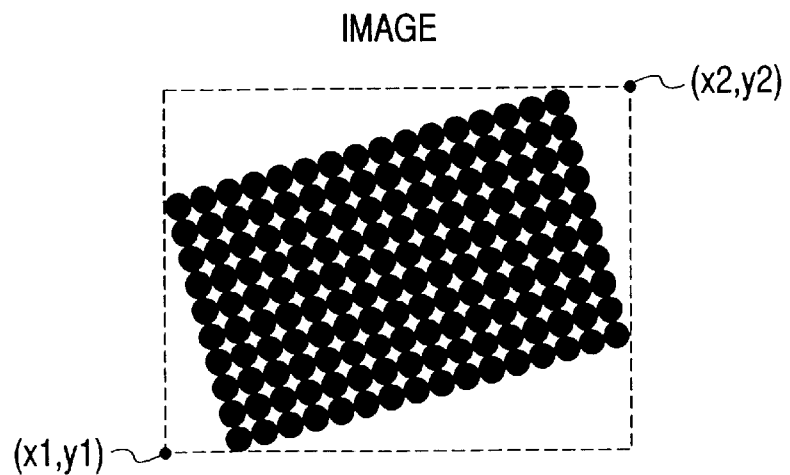
FIG. 7 is a view which illustrates the first embodiment in detail in accordance with the present invention.

The setting area 51 of the developed image data area information in the memory map in FIG. 9A is the area where the coordinate value is set for the draw area of the image data on the image portion thus developed. Here, it is assumed that the coordinate system of the image data of one page portion is defined as shown in FIG. 5, and that the draw area of the image data on the image portion thus developed, and the coordinate system of the draw area are defined as exemplified in FIG. 6 and FIG. 7. Also, FIG. 6 shows the case where the rotational angle of the image data draw area of the image portion is zero, while FIG. 7 shows the example of the case where the draw area is rotated. The coordinate value of the draw area of the image data on the image portion, which is expressed with the absolute value of the coordinate system shown in FIG. 5, is set in the setting area 51 of the developed image data area information.

The setting area 52 of the information of information additional area of the memory map shown in FIG. 9B is the area where the coordinate value of the area for embedding the additional information is set for adding the information.

In accordance with the flowchart shown in FIG. 4, the S20 is the step in which the coordinate value of the draw area of the developed image data (the image data of the image portion) is detected, and the S21 is the step in which the coordinate value of the image data draw area thus detected in the S20 is set in the setting area 51 of the developed image data area information.

The S22 is the step in which the coordinate value of the draw area set in the setting area 51 of the developed image data area information is compared with the coordinate value of the information of all the area for adding information which is set in the setting area 52 of the information of information additional area. Then, if there is no superposing area, the coordinate value of the draw area detected in the S20 is additionally set in the setting area 52 of the information of information additional area as the updated information thereof, and at the same time, the value of the setting area 50 of the information additional area number is incremented by 1.

As a result of such comparison, if there is found an area which encircles completely the draw area set in the setting area 51 of the image data area information, the operation in the current step terminates without changing the information additional area numbers in the setting area 50 and the setting condition of the information of information additional area in the setting area 52.

Figure 8A:
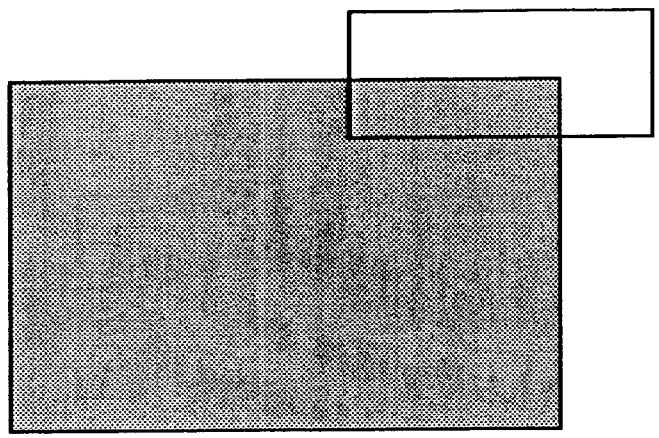
FIGS. 8A and 8B are views which illustrate the first embodiment in detail in accordance with the present invention.
Figure 8B:
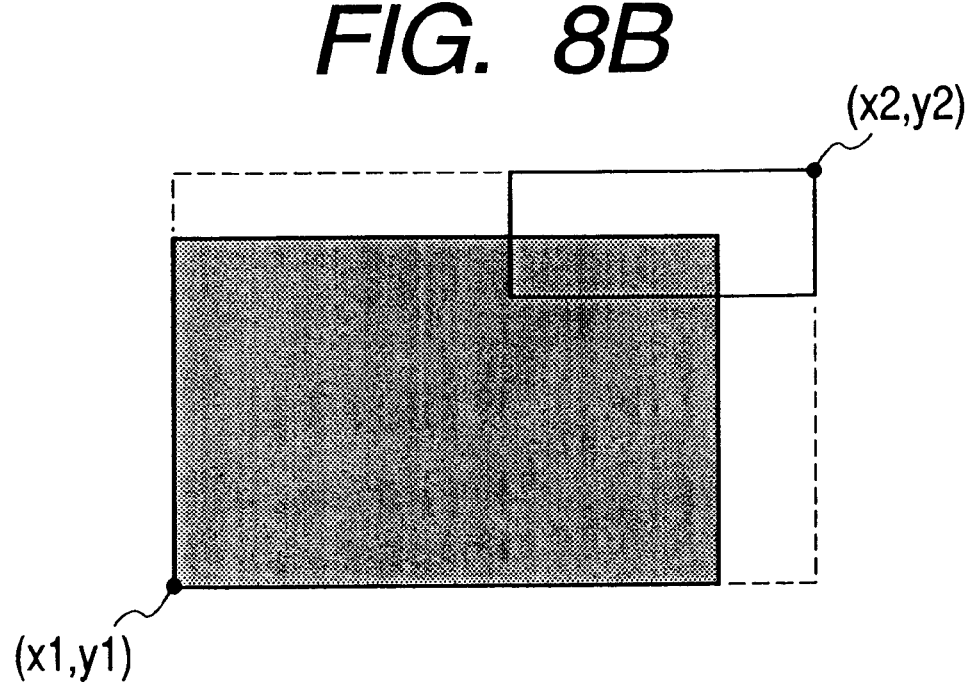

Here, if there is a superposed portion as exemplified in FIG. 8A, the coordinate value of the superposed information of information additional area, which has been set already in the setting area 52 thereof, is modified as shown in FIG. 8B. In this case, the value of the information additional area numbers in the setting area 50 is not changed.

If this modification is made, the modified information of information additional area is compared with all other information of information additional area set in the setting area 52 thereof. Then, if there is no superposed area, the operation in the current step terminates. If there is found a superposed area, the modification is given to one of the compared information of information additional area as in FIG. 8B. At the same time, the value of the other information of information additional area is all set to 0 (Xn1=0, Yn1=0, Xn2=0, Yn2=0).

When such modification of the information of information additional area takes place, the comparison between the modified information of information additional area and all the other information of the information additional area set in the setting area 52 thereof is repeated until the superposed area is eliminated completely.

With the execution of the process described above, the input of coded data is developed in the image processing unit 102, and the area (only the image portion) to which the additional information pattern is added is discriminated in accordance with the information of the image portion obtained at the time of development. Then, depending on the result of such discrimination, the pattern is embedded, and the embedded image data (color image data for printing use) is output to the image formation unit 101.

As described above, with the area information created at the time of having developed the coded data written in the page description language, it is possible to efficiently discriminate the area to which the pattern indicating the additional information should be added. Therefore, the load is made smaller than the conventional process where the area to which the pattern should be added is discriminated by analyzing all the image data in the bit map form.

Also, the pattern that indicates the additional information is not superposed at all on the marginal area but only on the draw area. Therefore, the additional information can be embedded without degrading the image quality ultimately obtainable from the original image as much as possible.

Further, it is arranged to avoid adding the pattern to the image portion, such as the character portion and graphical portion, which is not related to the valuable papers significantly.

Therefore, the degradation of the image quality is minimized.

Here, as described above, for the present embodiment, it is assumed that no additional information is embedded in the area where the value of the information of information additional area is all set at zero as the value which is set in the setting area 52 thereof.

Second Embodiment

Figure 10A:
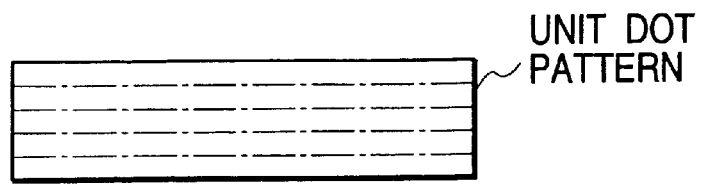
FIGS. 10A, 10B and 10C are conceptual views which illustrate the second embodiment of the present invention.
Figure 10B:
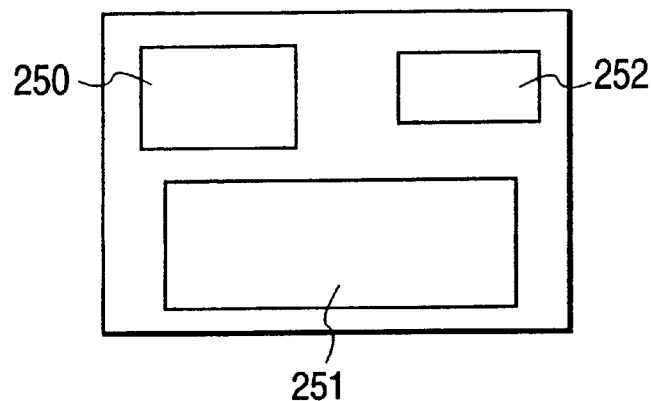
Figure 10C:
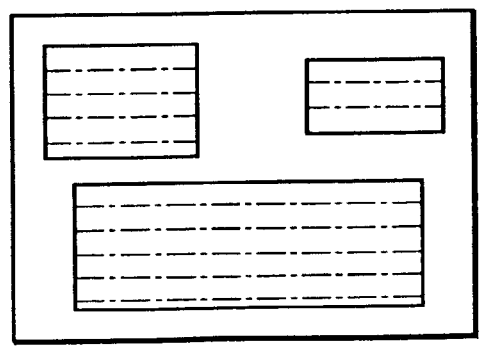

For the first embodiment, when the additional information is added only to the inside of the draw area of an image, the layout of the additional pattern is formed as in FIG. 1A for the unit area as a whole, which indicates the entire image of one page portion. After that, as shown in FIG. 1C, the actual process to add information is executed with respect to the inside of the draw area of the image portion of the image data which is developed as exemplified at 200, 201, and 202 shown in FIG. 1B. However, in order to completely represent the additional information shown in FIG. 10A in accordance with the present embodiment, the unit dot pattern formed by the minimum number of required lines is laid out afresh per draw area of each image portion of the image data developed as exemplified at 250, 251, and 252 in FIG. 10B. In this manner, it may be possible to execute the actual image additional process only within the draw area as shown in FIG. 10C.

Third Embodiment

In conjunction with FIG. 11, the description will be made of a third embodiment in accordance with the present invention. Since the fundamental processes are the same as those of the above-described embodiments, respectively. Here, only the characteristics of the present embodiment will be described in detail.

In accordance with the present invention, although the information additional process is executed in the same manner as the first embodiment, the additional information is not added to all the draw areas of the image portion of the developed image data. Here, the size of the information adding area is determined in accordance with the information of additional area information set in the setting area 52 thereof in FIG. 9B described for the first embodiment. However, the adding process of the additional information is not executed with respect to the area having the value which is less than the regulated value, because there is no need for adding the additional information to the image which is smaller than the predetermined size, such as the image having the size smaller than the postage stamp, or because there is a fear that an addition of the kind only results in the degradation of the image quality.

Figure 11:
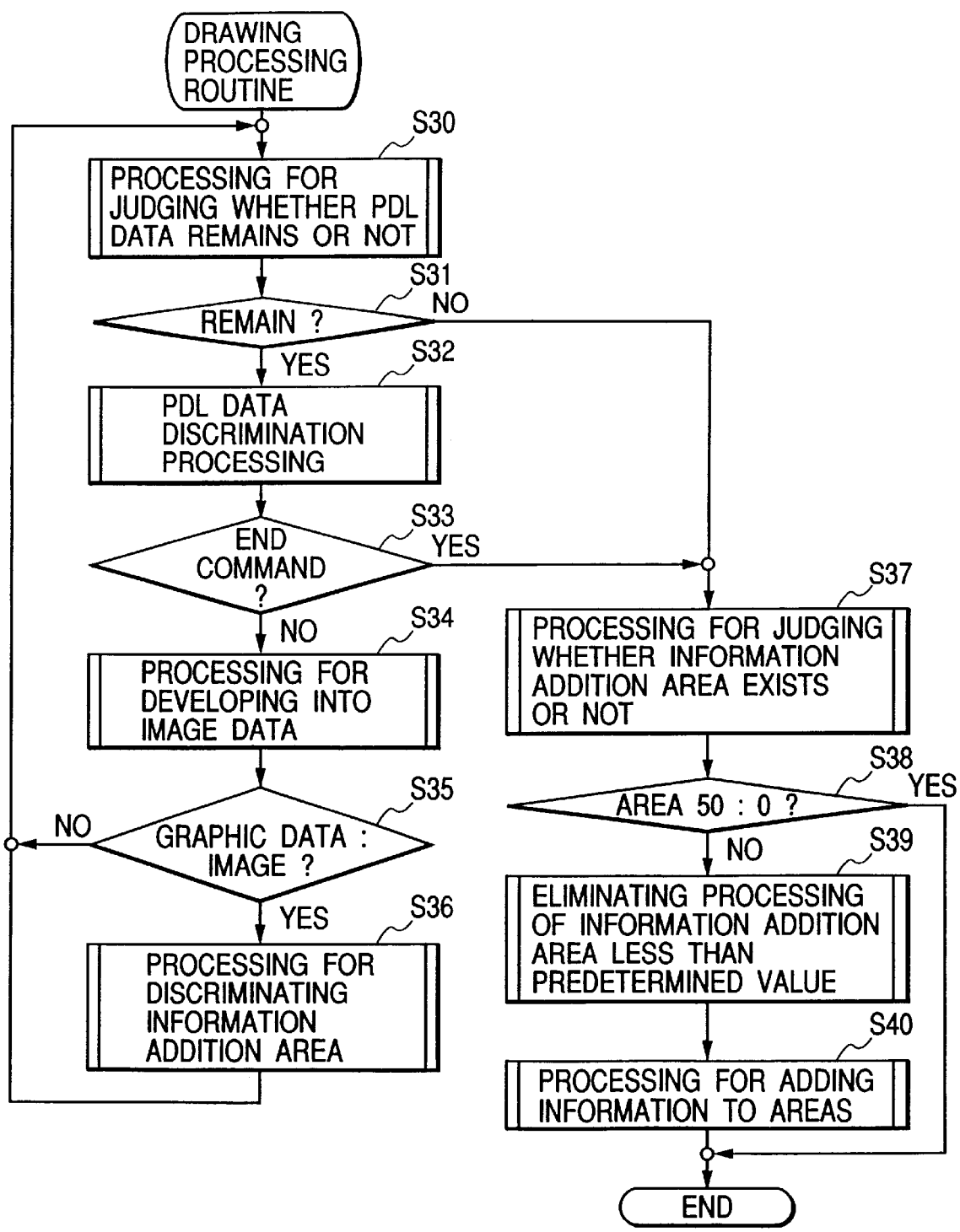
FIG. 11 is a conceptual view which illustrates the third embodiment of the present invention.

In this respect, FIG. 11 and FIG. 4 are the flowcharts of the present embodiment, in accordance of which the control program is stored on the ROM 8 in FIG. 13. The CPU 5 performs the execution thereof accordingly.

In the flowchart shown in FIG. 11, S30 and S31 are the steps to examined whether or not the PDL data remains in the page memory 3, and determine the flow to follow thereafter.

As a result, if any image data remains, the step S32 is executed. If not, the step S37 is executed.

The S32 and S33 are the steps to analyze the PDL data to discriminate whether or not it is the termination command. If negative, the step S34 is executed. If affirmative, the step S37 is executed.

The S34 is the step to analyze the PDL data stored on the page memory 3. In accordance with the result thereof, each of the character strings, the graphical portion and the image portion is developed into the respective image data.

The S35 is the step to determine whether the image data thus developed in the S31 is the character strings or the image portion other than the graphics. If it is found to be the image portion, the step S36 is executed. If not, the step S30 is executed.

The S36 is the step in which the area is discriminated in order to embed the pattern indicating the additional information. This discrimination step will be described later in detail.

The S37 and S38 are the steps in which the execution of the following flow is determined depending on whether or not there is any area (the image drawing area) to which the additional information should be added. Then, if the setting contents of the area 50, where the number of areas to which information should be added, that is, the number of drawing areas, is set and stored, is other than zero, the step S39 is executed. If such content is zero, the drawing process routine terminates.

The S39 is the step in which the information of information additional area set in the setting area 52 thereof is examined in accordance with the number of the information addition areas set in the setting area 50, and then, the size of the information additional area is determined by the information of information additional area. If the size is found to be less than the regulated value, all the values of the information of information additional area is set to 0 (Xn1=0, Yn1=0, Xn2=0, Yn2=0).

For the regulated size here, the length of shorter side of a bank note or the like is assumed, for example. If the length of side of a rectangle that forms the information additional area is all smaller than the length of the shorter side of the bank note, there is no possibility that the fabricated image of the bank note is printed. It is then unnecessary to add the information to the draw area thereof.

The S40 is the step in which the additional pattern is embedded for adding the information in accordance with the setting value of the information additional area numbers in the setting area 50 and the setting information of the information of information additional area in the stetting area 52 with respect to the color image data sent out to the image formation unit 101.

The setting area 51 of the developed image data area information in the memory map in FIG. 9A is the area where the coordinate value is set for the draw area of the image data on the image portion thus developed.

Here, it is assumed that the coordinate system of the image data of one page portion is defined as shown in FIG. 5, and that the draw area of the image data on the image portion thus developed, and the coordinate system of the draw area are defined as exemplified in FIG. 6 and FIG. 7.

Also, FIG. 6 shows the case where the rotational angle of the image data draw area of the image portion is zero, while FIG. 7 shows the example of the case where the draw area is rotated. The coordinate value of the draw area of the image data on the image portion, which is expressed with the absolute value of the coordinate system shown in FIG. 5, is set in the setting area 51 of the developed image data area information.

The setting area 52 of the information of information additional area of the memory map shown in FIG. 9B is the area where the coordinate value of the area for embedding the additional information is set for adding the information.

In accordance with the flowchart shown in FIG. 4, the S20 is the step in which the coordinate value of the draw area of the developed image data (the image data of the image portion) is detected.

Then, the S21 is the step in which the coordinate value of the image data draw area thus detected in the S20 is set in the setting area 51 of the developed image data area information.

The S22 is the step in which the coordinate value of the draw area set in the setting area 51 of the developed image data area information is compared with the coordinate value of the information of all the area for adding information which is set in the setting area 52 of the information of information additional area. Then, if there is no superposing area, the coordinate value of the draw area detected in the S20 is additionally set in the setting area 52 of the information of information additional area as the updated information thereof, and at the same time, the value of the setting area 50 of the information additional area number is incremented by 1.

As a result of such comparison, if there is found an area which encircles completely the draw area set in the setting area 51 of the image data area information, the operation in the current step terminates without changing the information additional area numbers in the setting area 50 and the setting condition of the information of information additional area in the setting area 52.

Here, if there is a superposed portion as exemplified in FIG. 8A, the coordinate value of the superposed information of information additional area, which has been set already in the setting area 52 thereof, is modified as shown in FIG. 8B.

In this case, the value of the information additional area numbers in the setting area 50 is not changed. If this modification is made, the modified information of information additional area is compared with all other information of information additional area set in the setting area 52 thereof. Then, if there is no superposed area, the operation in the current step terminates. If there is found a superposed area, the modification is given to one of the compared information of information additional area as in FIG. 8B. At the same time, the value of the other information of information additional area is all set to 0 (Xn1=0, Yn1=0, Xn2=0, Yn2=0).

When such modification of the information of information additional area takes place, the comparison between the modified information of information additional area and all the other information of the information additional area set in the setting area 52 thereof is repeated until the superposed area is eliminated completely.

As described above, in accordance with the present embodiment, no additional pattern is embedded for those having zero value of the information of information additional area as the value set in the setting area 52 thereof.

Here, for the method for adding the additional information for one page portion, it may be possible to set the add-on line shown in FIG. 16 with one page as one area, while a plurality of additional information being assumed to be one information line. However, it may be possible to add a plurality of additional information as a plurality of information lines independently in different areas within one page. Now, in conjunction with FIG. 12, this method be described.

FIGS. 12A and 12B are views which illustrate the image of one page portion indicated by color image data. A reference mark A designates the area to add the product number to the image processing unit 102; and B, the area to add the manufacturer's ID of the image processing unit 102. These areas form one page portion.

More specifically, on the area A within the unit area, the dot pattern that indicates the manufacturer's serial number of the image processing unit 102 is embedded, and also, on the area B, the dot pattern that indicates the manufacture's ID of the image processing unit 102 is embedded.

In this respect, the positional relationship between these two pieces of additional information, which should be added within one page, may be designed appropriately. For example, each of the areas A and B may be arranged alternately as shown in FIGS. 12A and 12B.

(Decoding of the Additional Information)

In this respect, the system, apparatus, and method for decoding in accordance with each of the embodiments described above, and the storage medium that stores the program to execute this method are construed to be within the scope of the present invention.

Now, one example of the decoding device will be described briefly.

When the above-described additional information is decoded, there is used a decoding system dedicated therefor. This system comprises a computer provided with a scanner that can read the ultimately printed image as color images; a specific color extraction tool that can extract only Y (yellow) component having the additional information added thereon from the color image data thus obtained; and a decoding tool that can compute ultimately the additional information (the manufacture's ID, the body number, the model number, the substrate ID, the user ID, and some others) with the automatic discrimination of the dot arrangement condition of the Y component in accordance with the adding method of each of the above embodiments, and a display unit to show the additional information thus obtained to let the managerial person recognize it.

When any printed image is found as an illegal image formation, the above-described system is able to work out the image processing apparatus used for the formation of such illegal image.

Here, the system described above may be structured as a single apparatus.

Also, the process of each unit of the system described above is allocated to the hardware and software as required.

Another Embodiment

In accordance with the flowchart shown in FIG. 3, it is arranged to discriminate the graphical data or the photographic data when developed into the image data in the step S15. A discrimination of the kind is not a prerequisite for the present invention.

Figure 19:
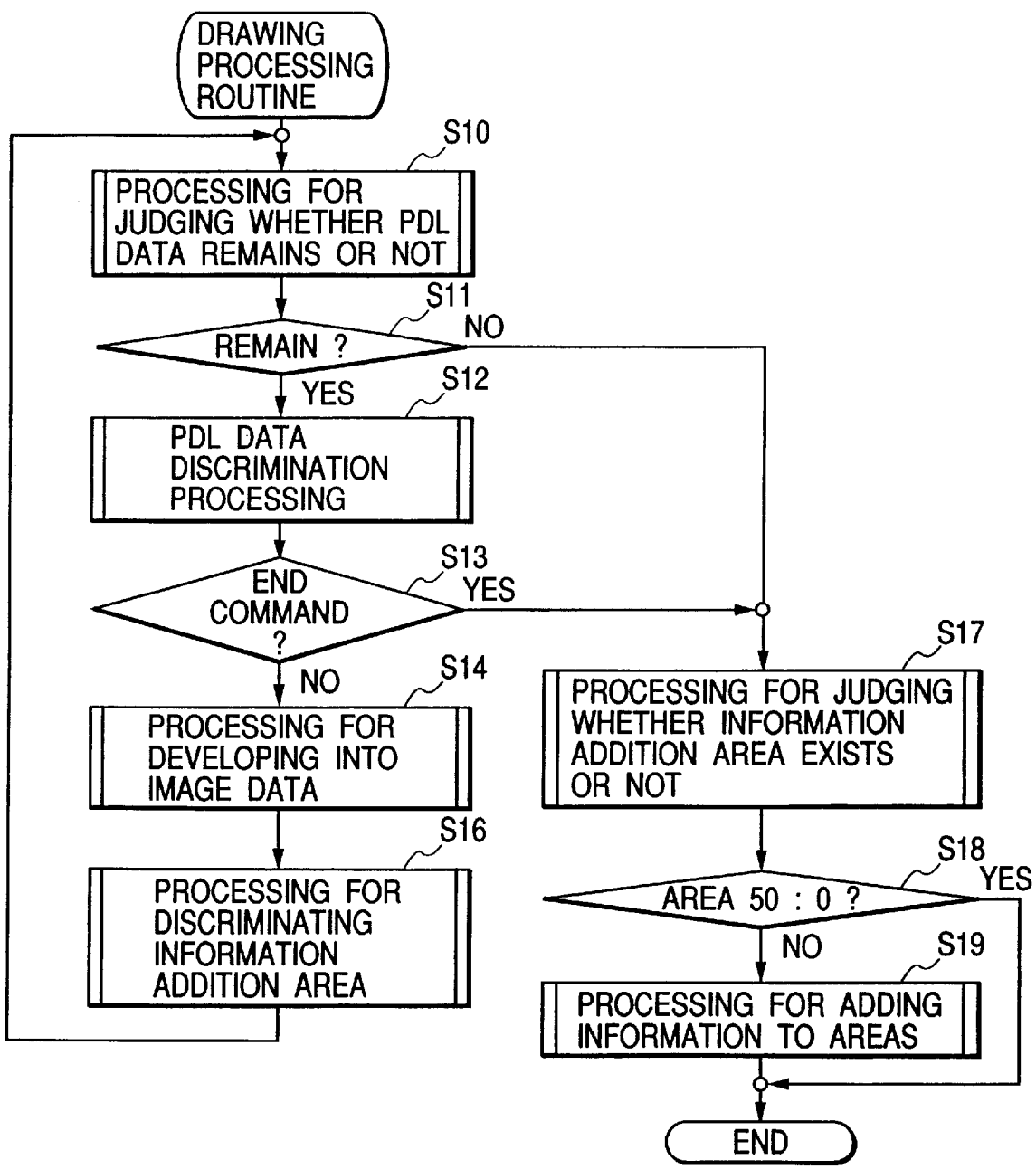
FIG. 19 is a flowchart which shows the embodiment described in FIG. 3.

As described in conjunction with FIG. 19, the omission of the step S15 shown in FIG. 3 is also construed to be within the scope of the present invention.

Figure 20:
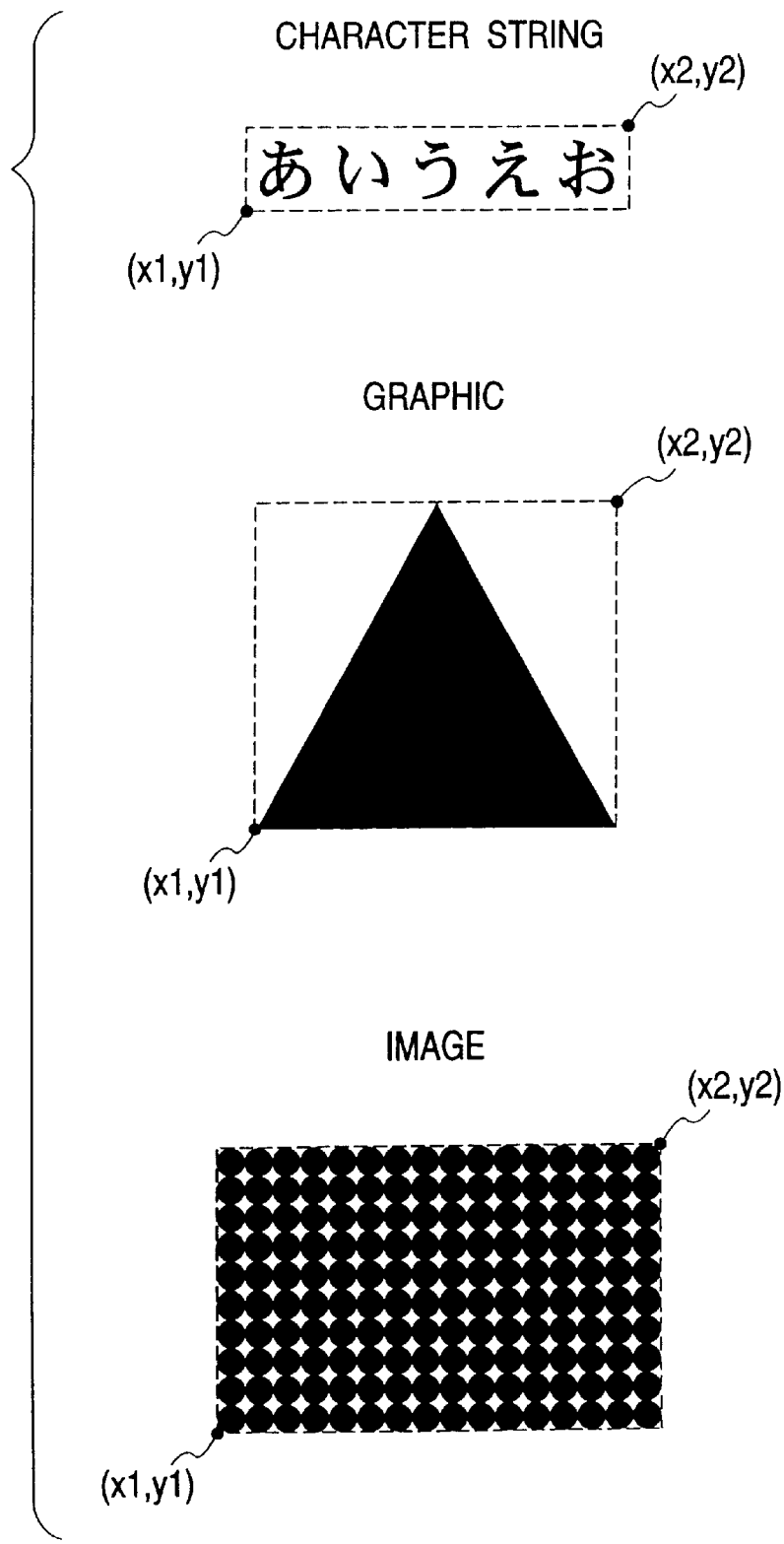
FIG. 20 is a view which shows one example of the image to be developed.
Figure 21:
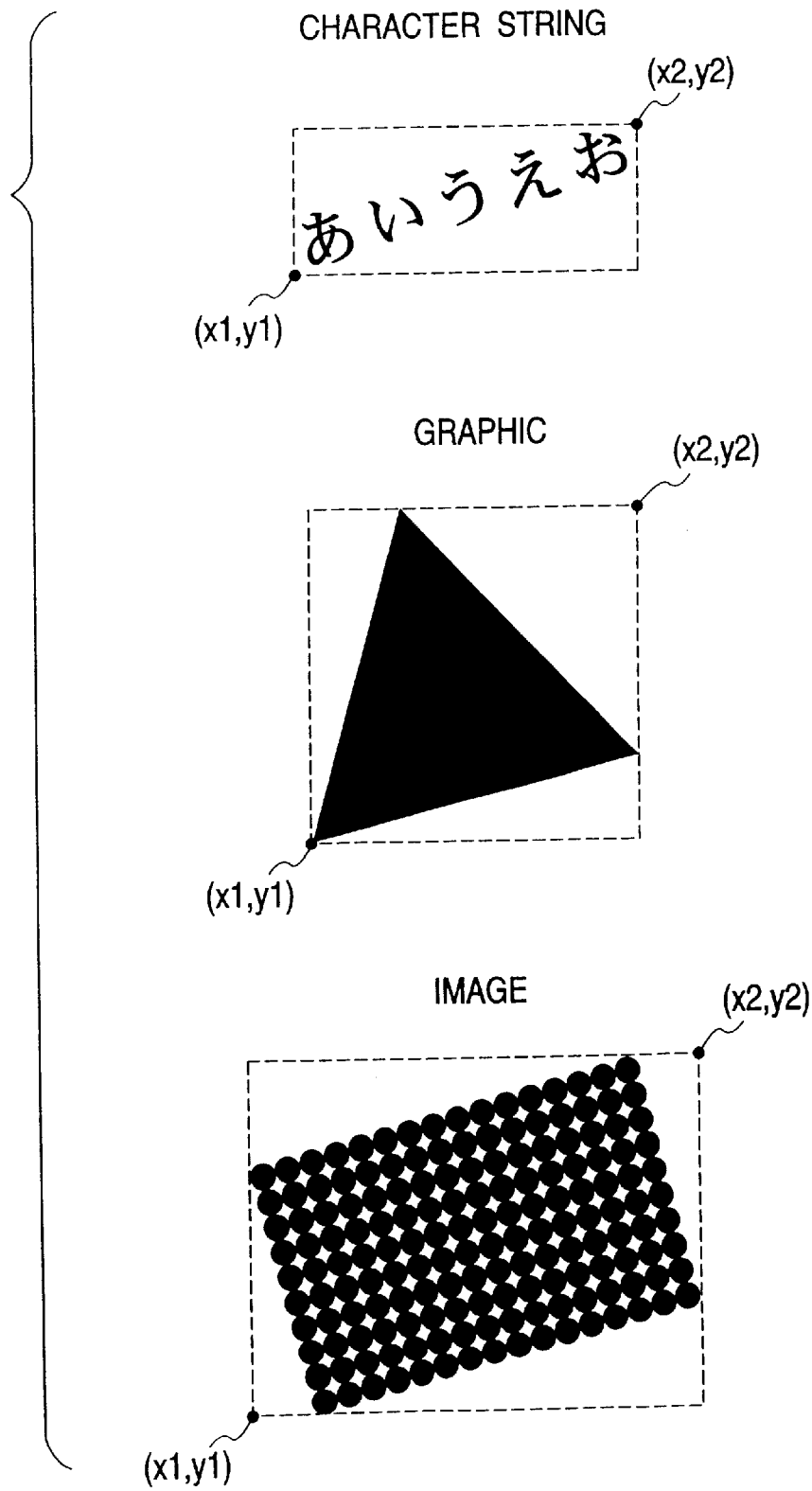
FIG. 21 is a view which shows another example of the image to be developed.

In this case, the three kinds of data, that is, the character strings, the graphics, and the images, shown in FIG. 20 and FIG. 21, can be developed each individually, and the additional information is embedded for all of them.

Now, the description will be made of the embodiment in which a suitable pattern for an object image is added hardly recognizable by eye-sight.

Figure 23:
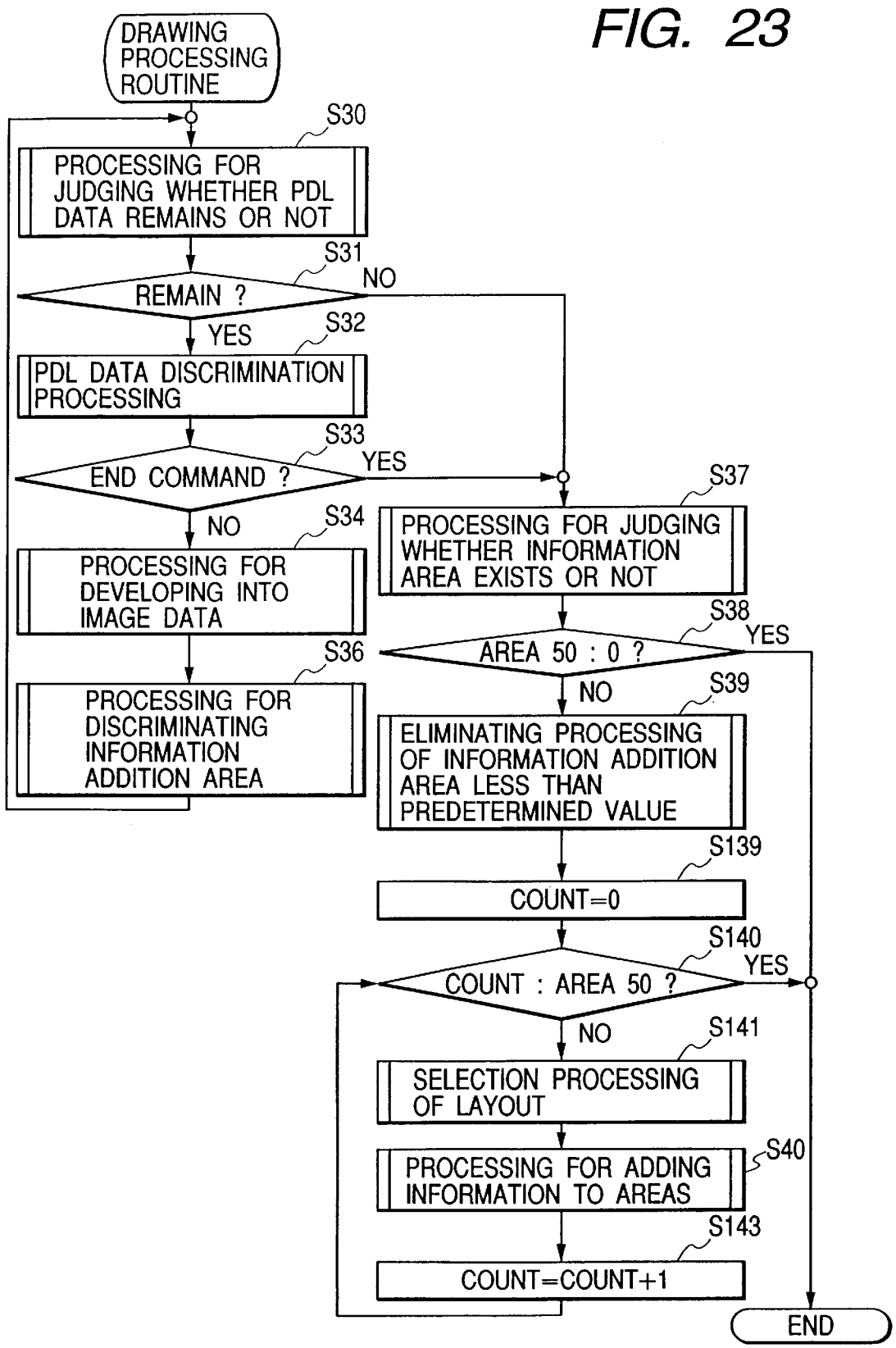
FIG. 23 is a flowchart which illustrates the embodiment shown in FIGS. 22A, 22B, 22C and 22D.

For an embodiment of the kind, a flowchart shown in FIG. 23 is implemented instead of the one shown in FIG. 3.

As shown in FIG. 22A, there are set the three kinds of layouts of the unit dot patterns formed by the minimum line numbers required for representing the additional information completely. Then, in accordance with the height of the draw area where the image data is developed on the basis of the image data sent out from the host computer as exemplified at 200, 201, and 202 in FIG. 22B, the layout is selected from those shown in FIG. 22A. Using the layout thus selected the actual information additional process is executed only within the draw area as shown in FIG. 22C. Here, as shown in FIG. 22D, the layout is decided on as either one of A to C depending on the area in which the pattern should be added, that is, the size of the draw area (the height hx for the present embodiment). Also, if the size (the height hx) is extremely small, it may be interpreted as too small to form images illegally as valuable papers or the like, and the pattern is not added at all.

The layout A, the layout B, and the layout C shown in FIG. 22A are different in size (that is, distance between the add-on lines themselves in the sub-scanning direction each other), but the same additional information (the manufacturer's ID and others).

FIG. 23 is a flowchart for the execution of the operation embodying the present invention using the hardware shown in FIG. 10 and the memory map shown in FIG. 2.

For the flowchart shown in FIG. 23, the same reference marks as those adopted in FIG. 11 are applied to the steps having the same functions. In FIG. 23, S30 and S31 are the steps to examined whether or not the PDL data remains in the page memory 3, and determine the flow to follow thereafter.

As a result, if any image data remains, the step S32 is executed. If not, the step S36 is executed.

The S32 and S33 are the steps to analyze the PDL data to discriminate whether or not it is the termination command. If negative, the step S34 is executed. If affirmative, the step S36 is executed.

The S34 is the step to analyze the PDL data stored on the page memory 3. In accordance with the result thereof, the development is process into the image data in the bit map form.

The S36 is the step in which the area is discriminated in order to embed the pattern indicating the additional information. The details of this discrimination step is the same as the step S16 in FIG. 3.

The S37 and S38 are the steps in which the execution of the following flow is determined depending on whether or not there is any area (the image drawing area) to which the additional information should be added. Then, if the setting contents of the area 50, where the number of areas to which information should be added, that is, the number of drawing areas, is set and stored, is other than zero, the step S39 is executed. If such content is zero, the drawing process routine terminates.

The S39 is the step in which the information of information additional area set in the setting area 52 thereof is examined in accordance with the number of the information addition areas set in the setting area 50, and then, the size of the information additional area is determined by the information of information additional area. If the size is found to be less than the regulated value, all the values of the information of information additional area is set to 0 (Xn1=0, Yn1=0, Xn2=0, Yn2=0).

For the regulated size here, the length of shorter side of a bank note or the like is assumed, for example. If the length of side of a rectangle that forms the information additional area is all smaller than the length of the shorter side of the bank note, there is no possibility that the fabricated image of the bank note is formed. It is then unnecessary to add the information to the draw area thereof.

The S139 is the step in which zero is set to the COUNT area as the initial value which is utilized for the counter, and provisionally kept in the working RAM 7 used by the CPU 5.

The S140 is the step to determine the following flow in accordance with the contents set on the COUNT. In other words, if the set contents of the COUNT is different from those of the information additional area number in the setting area 50, the step 141 is executed. If those are the same, the draw process routine terminates.

The S141 is the step to select one information of the information additional area from the information setting area 52 in accordance with the set contents of the COUNT, and to select the layout from those in FIG. 22A in accordance with the height of the draw area of the developed image data shown by the selected information of information additional area. This method for selecting the layout is the same as the one described in FIG. 22D.

Here, the selected information of information additional area begins with the one at the head of the setting area 52 of the information, and then, selected one after another along with the increase of the value of the set contents of the COUNT.

The S40 is the step in which the pattern that indicates the additional information is embedded on the draw area selected in the S141 using the each layout selected in the S141.

The S143 is the step in which the set contents of the COUNT is incremented by 1.

Still Another Embodiment

For the embodiment described in conjunction with FIGS. 22A to 22D and FIG. 23, there are set the three kinds of layout methods of the unit dot patterns (the add-on lines $a_1$ to $a_4$) formed by the minimum line number required for representing the additional information completely as shown in FIG. 22A. When the additional information is added only to the inside of the draw area of an image, the layout of the additional pattern is formed as in FIG. 1A for the unit area as a whole, which indicates the entire image of one page portion. After that, as shown in FIG. 1C, the actual process to add information is executed with respect to the inside of the draw area of the image portion of the image data which is developed as exemplified at 200, 201, and 202 shown in FIG. 1B. However, in order to completely represent the additional information shown in FIG. 10A in accordance with the present embodiment, the unit dot pattern formed by the minimum number of required lines is laid out afresh per draw area of each image portion of the image data developed as exemplified at 250, 251, and 252 in FIG. 10B. In this manner, it may be possible to execute the actual image additional process only within the draw area as shown in FIG. 10C. Then, either one of the A to C layouts is selected from in FIG. 22A in accordance with the height of each draw area of the developed image, and then, using the selected layout the pattern is added actually only within the draw area as shown in FIG. 22C. However, without any preparation of the layout of the dot pattern in advance, it may be possible to determine the layout dynamically by computation with the height of the draw area. For example, each of the interval between add-on lines that forms the unit dot pattern is determined by dividing the height of the draw area by the numeral value arrived at by adding 1 to the line numbers required for the formation of the unit dot pattern. Then, conceivably, the arrangement of a method is possible to determine the actual layout on the basis of each of the intervals thus obtained.

In this way, the layout for pattern addition is set multiply corresponding to the object image indicated by each of the coded data (each of the draw areas). The method for adding the pattern is not necessarily limited to the embodiment described above. It may be possible to adopt various methods, and an embedding method should be selected corresponding to the size of the object image accordingly.

In accordance with the present embodiment, it becomes possible for the image processing apparatus that forms object images to add the additional information to the object reliably and invisibly by eye-sight, and to enhance the suppressible power of the apparatus against the formation of illegal images.

More specifically, the coded data written in a specific description language is developed. Then, when each of the object images is formed corresponding to the coded data thus developed, it is arranged to add the pattern suitable for each of the objects, which is made hardly discriminative by eye-sight, hence making is possible to enhance the suppressive power of a page printer or the like against the formation of illegal images.

In this respect, the present invention is not limited only to the apparatus and method for the implementation of the embodiments described above. The programming codes of a software is supplied to the above-described system or the computer (CPU or MPU) installed in the apparatus for the implementation of the embodiments described above, and the system or the computer in the apparatus is allowed to operate various devices described above in accordance with the programming codes thus provided, hence implementing the above-described embodiments. Here, it is to be understood that this case is also within the scope of the present invention.

Further, in this case, the programming codes themselves of the aforesaid software are construed to implement the functions of the embodiments described above. Therefore, it is to be understood that the programming codes themselves, and means for supplying them to the computer, which is, more specifically, a storage medium that stores the aforesaid programming codes are also within the scope of the present invention.

As the storage medium that stores such programming codes, there are usable, for example, a floppy disc, a hard disc, an optical disc, an opto-magnetic disc, a CD-ROM, a magnetic tape, a non-volatile memory card, and a ROM, among some others.

Further, not only the case where the aforesaid computer controls the various devices only in accordance with the programming codes thus supplied for the implementation of the functions of the above-described embodiments, but also, there is a case where the implementation thereof is possible by means of the programming codes in cooperation with the OS (operating system) that operates on the computer or with other application software or the like. In this case, too, the programming codes are construed to be within the scope of the present invention.

Further, the programming codes thus supplied are stored on the memory provided for a function expanded board of the computer or a function expanded unit connected with the computer. Then, after that, the CPU or the like installed on such function expanded board or function expanded unit is allowed to execute the actual process partly or totally, and then, the above-described embodiments are implemented by means of such processes. It is to be understood that this case is also within the scope of the present invention.

Also, in accordance with the embodiments of the present invention, it has been described that the pattern corresponding to the information is directly embedded on the image as a method for embedding the information in the image. However, the present invention is not limited to such method. The invention may be applicable to some other methods. For example, there is an embedding method using an inverted orthogonal conversion, in which the image information is orthogonally converted, and the additional information is added to the information thus orthogonally converted, or an embedding method using conversion, in which the quantized value of a pixel value is converted in accordance with the information to be added, among others.

As described above, in accordance with the embodiments, it is possible to add the pattern that indicates the additional information to the draw area corresponding to the image portion of an image. As a result, the additional information is added in such a manner as to make it hardly discriminative by eye-sight with respect to the inputted image without degrading the quality of the image to be formed ultimately. Further, the pattern that indicate the additional information and the area to which it is added are discriminated from each other in accordance with the information that indicates the draw area, which is created at the time of development. Therefore, it becomes possible to minimize the load of processes as compared with the case where the drawing positions are analyzed with the analysis of the entire image in order to discriminate the pattern additional area.

What is claimed is:

1. An image processing apparatus comprising:
    development means for developing coded data into image data by analyzing the coded data and, at the same time, creating positional information within one display area of said image data;
    discrimination means for discriminating an image area to embed specific information therein in accordance with the positional information created by said development means at the time of development;
    means for embedding the specific information in the image area discriminated by said discrimination means in a manner that makes it difficult for humans eyes to discriminate the presence of the specific information; and
    determination means for determining the size of the developed image data, said embedding means being arranged, in accordance with the result of the determination by said determination means, not to embed to specific information.

2. An image processing apparatus according to claim 1, wherein said coded data is the data written in a page description language.

3. An image processing apparatus according to claim 1, wherein said specific information is a manufacturer's ID, a body number, a model number or a substrate ID of said image processing apparatus.

4. An image processing apparatus according to claim 1, wherein said image data is formed by the data having plural color components, and said embedding means embeds said specific information with respect at least to a part of said plural color components, but not to all of them.

5. An image processing apparatus according to claim 1, wherein said discrimination means is the means for discriminating the image data obtained by said development means with the analysis of the specific coded data.

6. An image processing apparatus according to claim 5, wherein said specific coded data are codes other than character codes.

7. A image processing method comprising the following steps of:
developing coded data into image data by analyzing the coded data and, at the same time, creating positional information within one display area of said image data;
discriminating an image area to embed specific information therein in accordance with the positional information created in said developing step at the time of development;
embedding the specific information in the image area discriminated in said discriminating step in a manner that makes it difficult for human eyes to discriminate the presence of the specific information; and
determining the size of the developed image data, wherein said embedding step, in accordance with the result of the determination in said determining step, does not embed the specific information.

8. An image processing method according to claim 7, wherein said coded data is the data written in a page description language.

9. An image processing method according to claim 7, wherein said specific information is the information to specify said image data.

10. An image processing apparatus according to claim 7, wherein said image data is formed by the data having plural color components, and said specific information is embedded in said embedding step with respect at least to a part of said plural color components, but not to all of them.

11. An image processing method according to claim 7, wherein said discriminating step is the step of discriminating the image data obtained in said developing step with the analysis of the specific coded data.

12. An image processing method according to claim 11, wherein said specific coded data are codes other than character codes.

13. An image processing method comprising the following steps of:

converting given coded information into image data;
embedding specific information in the image data when the coded information does not indicate a character, irrespective of the density of said image information; and
determining the size of the converted image data, wherein said embedding step, in accordance with the result of the determination in said determining step, does not embed the specific information.

14. An image processing method according to claim 13, wherein said specific information is the information to specify said image data.

15. An image processing method according to claim 13, wherein said coded data is the data written in a page description language.

16. An image processing method according to claim 13, wherein said image data is formed by the data having plural color components, and said specific additional information is embedded in said embedding step with respect at least to a part of said plural color components, but not to all of them.

17. An image processing apparatus comprising:
creating means for creating image data;
determination means to detect the size of the image shown by the image data created by said creating means, and to determine the size of a unit pattern indicating specific additional information in accordance with the detected size of the image; and
adding means to add the unit pattern of the size determined by said determination means to the image shown by said image data in a manner that makes it difficult for human eyes to discriminate the unit pattern.

18. An image processing method comprising the following steps of:
creating image data;
detecting the size of the image shown by the image data created in said creating step, and determining the size of a unit pattern indicating specific additional information in accordance with the detected size of the image; and
adding the unit pattern of the size determined in said determining step to the image shown by said image data in a manner that makes it difficult for human eyes to discriminate the unit pattern.

19. A storage medium for storing an image processing program in a state of being readable by a computer, said image processing program comprising the following steps of:
creating image data;
detecting the size of the image shown by the image data created in said creating step, and determining the size of a unit pattern indicating specific additional information in accordance with the detected size of the image; and
adding the unit pattern of the size determined in said determining step to the image shown by said image data in a manner that makes it difficult for human eyes to discriminate the unit pattern.

* * * * *

UNITED STATES PATENT AND TRADEMARK OFFICE
CERTIFICATE OF CORRECTION

PATENT NO. : 6,570,997 B2
DATED : May 27, 2003
INVENTOR(S) : Noguchi

It is certified that error appears in the above-identified patent and that said Letters Patent is hereby corrected as shown below:

Column 2,
Line 22, "image" should read -- images --;
Line 32, "ultimately" should read -- ultimate --; and
Line 66, "to" should read -- of --.

Column 4,
Line 17, "sa-called" should read -- so-called --; and
Line 64, "patten" should read -- pattern --.

Column 6,
Line 45, "one" should read -- ones --.

Column 7,
Line 46, "dots" should read -- dot --.

Column 8,
Line 8, "staring" should read -- starting --;
Line 17, "been" should read -- been given --; and
Line 26, "imaged" should read -- images --.

Column 12,
Line 13, "examined" should read -- examine --.

Column 15,
Line 35, "each" should read -- differs from each --;
Line 36, "the same" should read -- have the same --;
Line 45, "examined" should read -- examine --;
Line 56, "development is process into" should read -- processing develops --; and
Line 60, "is the same as" should read -- are the same as those of --.

Column 17,
Line 15, "interval" should read -- intervals --; and
Line 41, "is" should read -- it --.

UNITED STATES PATENT AND TRADEMARK OFFICE
CERTIFICATE OF CORRECTION

PATENT NO. : 6,570,997 B2
DATED : May 27, 2003
INVENTOR(S) : Noguchi

It is certified that error appears in the above-identified patent and that said Letters Patent is hereby corrected as shown below:

Column 18,
Line 42, "indicate" should read -- indicates --; and
Line 62, "humans" should read -- human --.

Signed and Sealed this

Twenty-eighth Day of September, 2004

JON W. DUDAS
*Director of the United States Patent and Trademark Office*